(12) United States Patent
Batchelder et al.

(10) Patent No.: US 11,385,766 B2
(45) Date of Patent: Jul. 12, 2022

(54) TECHNOLOGIES FOR INDICATING DECEPTIVE AND TRUSTWORTHY RESOURCES

(71) Applicant: AppEsteem Corporation, Bellevue, WA (US)

(72) Inventors: Dennis Batchelder, Seattle, WA (US); Hong Jia, Bellevue, WA (US); Neil Comisioneru, Redmond, WA (US); Andrey Grebenik, Redmond, WA (US); Pavel Braginsky, Bellevue, WA (US)

(73) Assignee: AppEsteem Corporation, Bellevue, WA (US)

( * ) Notice: Subject to any disclaimer, the term of this patent is extended or adjusted under 35 U.S.C. 154(b) by 0 days.

(21) Appl. No.: 16/240,950

(22) Filed: Jan. 7, 2019

(65) Prior Publication Data
US 2020/0218433 A1 Jul. 9, 2020

(51) Int. Cl.
| | |
|---|---|
| *G06F 3/0482* | (2013.01) |
| *G06F 3/0484* | (2013.01) |
| *G06F 8/30* | (2018.01) |
| *G06F 8/38* | (2018.01) |
| *G06F 16/957* | (2019.01) |
| *G06F 3/04845* | (2022.01) |
| *G06F 3/04842* | (2022.01) |

(52) U.S. Cl.
CPC ........ *G06F 3/0482* (2013.01); *G06F 3/04842* (2013.01); *G06F 3/04845* (2013.01); *G06F 8/30* (2013.01); *G06F 8/38* (2013.01); *G06F 16/9577* (2019.01)

(58) Field of Classification Search
CPC .......................... G06F 3/04845; G06F 3/0482
See application file for complete search history.

(56) References Cited

U.S. PATENT DOCUMENTS

| | | |
|---|---|---|
| 7,913,292 B2 | 3/2011 | Hartrell et al. |
| 8,201,244 B2 | 6/2012 | Sun et al. |
| 8,661,260 B2 | 2/2014 | Leonard |
| (Continued) | | |

OTHER PUBLICATIONS

Zolfagharifard, "Facebook adds warnings on graphic content that can 'shock, offend and upset'—but does the measure go far enough?," Jan. 13, 2015, https://www.dailymail.co.uk/sciencetech/article-2909087/Facebook-adds-warnings-graphic-content-shock-offend-upset-does-measure-far-enough.html.*

(Continued)

*Primary Examiner* — Ryan Barrett
(74) *Attorney, Agent, or Firm* — Schwabe, Williamson & Wyatt, P.C.

(57) ABSTRACT

Methods, systems, and storage media are described for indicating deceptive or trustworthy resources are provided. A client system generates and renders a graphical user interface (GUI) comprising one or more graphical objects in a client application. The client system identifies resources corresponding to individual graphical objects. The client system communicates the identified resources to a reputation system, and obtains indicators indicating deceptive resources to be obfuscated and/or trustworthy resources to be illuminated. The client system obfuscates the deceptive resources and illuminates the trustworthy resources according to the received indicators. Other embodiments may be described and/or claimed.

19 Claims, 13 Drawing Sheets

(56) References Cited

U.S. PATENT DOCUMENTS

| | | | |
|---|---|---|---|
| 8,694,604 B2 | 4/2014 | Cummins et al. | |
| 8,762,980 B1* | 6/2014 | Sobel | G06F 8/65 717/170 |
| 8,850,581 B2 | 9/2014 | Wang et al. | |
| 8,887,245 B1 | 11/2014 | Wiltzius et al. | |
| 9,774,626 B1* | 9/2017 | Himler | H04L 63/1433 |
| 9,967,236 B1* | 5/2018 | Ashley | H04L 63/029 |
| 10,108,306 B2 | 10/2018 | Khoo et al. | |
| 10,437,988 B1* | 10/2019 | Newstadt | G06F 21/84 |
| 2007/0234209 A1* | 10/2007 | Williams | G06F 40/169 715/700 |
| 2008/0301802 A1* | 12/2008 | Bates | G06F 21/31 726/16 |
| 2009/0310165 A1 | 12/2009 | Olsson et al. | |
| 2011/0138441 A1 | 6/2011 | Neystadt et al. | |
| 2012/0144489 A1 | 6/2012 | Jarrett et al. | |
| 2013/0276105 A1* | 10/2013 | Hinchliffe | G06F 21/50 726/22 |
| 2014/0189859 A1* | 7/2014 | Ramanan | G06F 21/56 726/22 |
| 2014/0331119 A1 | 11/2014 | Dixon et al. | |
| 2015/0095759 A1* | 4/2015 | Olenick | G06F 3/0485 715/234 |
| 2015/0205767 A1* | 7/2015 | Stekkelpak | G06F 40/103 715/207 |
| 2015/0207804 A1* | 7/2015 | Van Brink | G06F 3/0482 726/3 |
| 2015/0281262 A1* | 10/2015 | Cai | H04L 67/02 726/23 |
| 2016/0057167 A1* | 2/2016 | Bach | H04L 63/101 726/23 |
| 2016/0065595 A1* | 3/2016 | Kim | H04L 63/1416 726/1 |
| 2016/0259497 A1* | 9/2016 | Foss | G06F 3/0481 |
| 2016/0294846 A1 | 10/2016 | Sharov et al. | |
| 2018/0046944 A1* | 2/2018 | Barbera | G06F 3/0482 |
| 2018/0183820 A1* | 6/2018 | Iyer | H04L 63/1483 |
| 2018/0335928 A1* | 11/2018 | Van Os | G06Q 20/204 |
| 2019/0164196 A1* | 5/2019 | Tang | G06F 16/9535 |
| 2019/0204996 A1* | 7/2019 | Elce | G06F 3/04817 |
| 2019/0228103 A1* | 7/2019 | Shirey | G06F 16/9577 |
| 2019/0340256 A1* | 11/2019 | Kulkarni | G06F 16/248 |
| 2021/0326035 A1* | 10/2021 | Jia | G06F 3/04817 |

OTHER PUBLICATIONS

Chandel, "Beginner Guide to HTML Injection,"Jul. 21, 2017, https://www.hackingarticles.in/beginner-guide-html-injection/.*

McNeil, "How to block ads like a pro," Jul. 19, 2018, https://blog.malwarebytes.com/security-world/2018/07/how-to-block-ads-like-a-pro/.*

Andy-h, "CSS to obfuscate text until you hover over it," Mar. 21, 2017, https://snippets.cacher.io/snippet/4b96eeb5222db7b74249.*

F. Alvarez et al., "Future Media Internet Architecture Reference Model (v1.0)", FMIA-TT Reference Model Outline, White Paper, Mar. 1, 2011 (16 pages).

Chandel, "Beginner Guide to HTML Injection", Jul. 21, 2017; https://www.hackingarticles.in/beginner-guide-jtmlinjection/.

* cited by examiner

TECHNOLOGIES FOR INDICATING DECEPTIVE AND TRUSTWORTHY RESOURCES

FIELD

The present disclosure relates to the technical field of computing, and in particular, to technologies for indicating trustworthiness or untrustworthiness of resources in graphical user interfaces.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Web browsers render and display webpages and/or web applications in response to user requests. The displayed webpages and/or applications may include links or references to various web resources, such as other content or applications. Some of these links or references may lead to malicious and/or deceptive resources. A malicious resource is a resource that is intentionally designed to cause damage to a computer system or computer network, whereas a deceptive resource is a resource that exhibits and/or has a reputation for deceptive behaviors or practices that may potentially harm users or consumers. Typically, filters or firewalls are used to block access to resources that have bad or poor reputations. However, filters and firewalls are susceptible to false positives wherein trustworthy or benign resources are inadvertently blocked. In some cases, a user may wish to interact with deceptive resources despite their reputation for deceptive behavior.

Usually the links or references to deceptive or malicious resources are in the form of advertisements or other content that are designed to entice the user to access the deceptive/malicious resources by selecting the links/references. These types of advertisements or content may be referred to as "teasers." Conventional solutions for indicating deceptive or malicious resources involve placing icons next to teasers or placing icons in a browser bar. These solutions are disadvantageous because the user is still exposed to the teaser that leads to the malicious or deceptive resource, and the user may still inadvertently access the deceptive or malicious resource.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
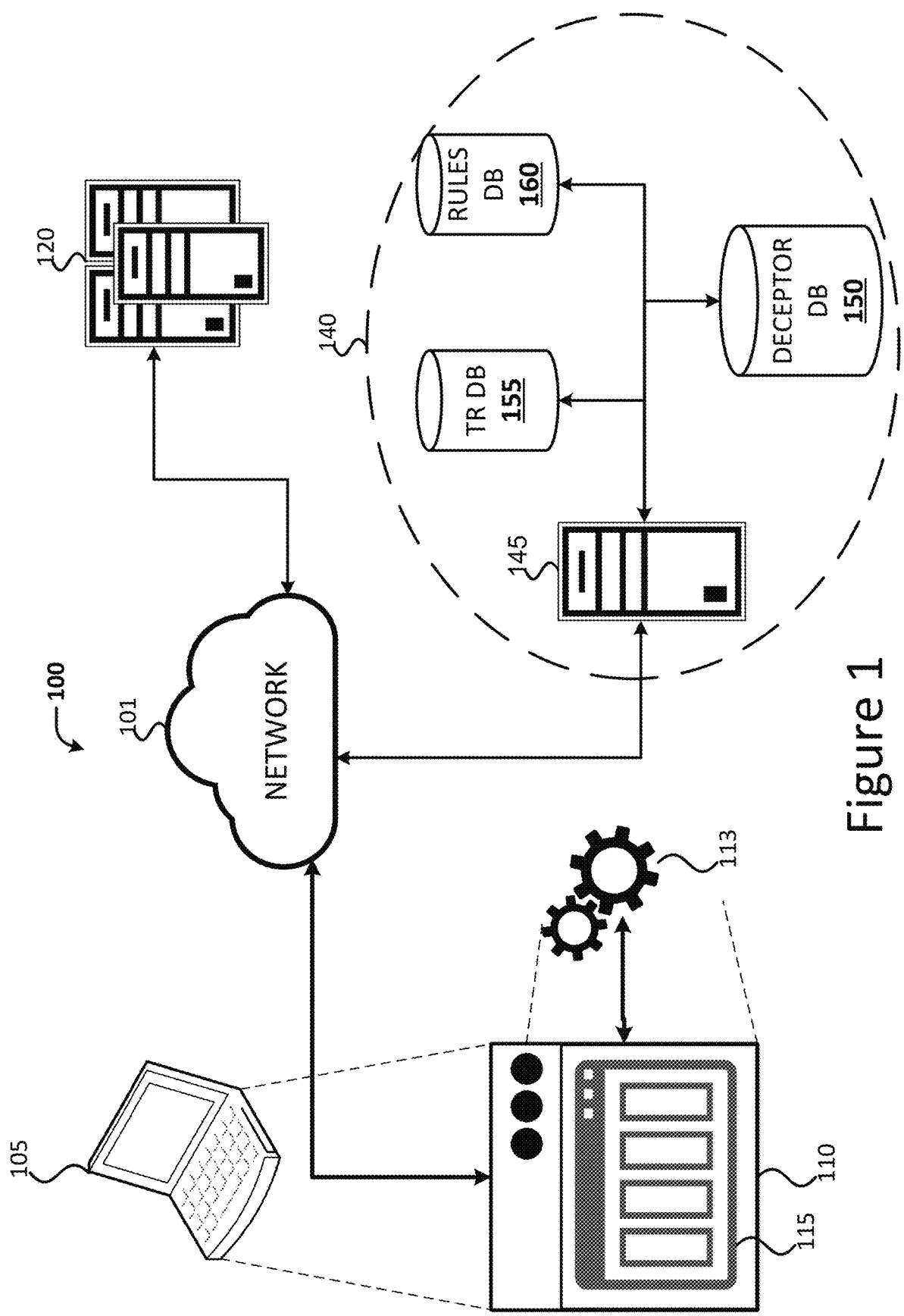
FIG. 1 illustrates an arrangement suitable for practicing various embodiments of the present disclosure.

Embodiments described herein are related to providing indications or trustworthy or untrustworthy content, services, and/or applications, when communicating over a network, such as the Internet. In various embodiments, a user systems operates an application that generates a graphical user interface (GUI), which overlays a visual indicator on top of rendered graphical objects based a source of the resources represented by the graphical objects. The graphical objects (or simply "objects") include, for example, content items (e.g., text, images, video, etc.), links or references to resources, applications, graphical control elements, or any other graphical representation of information or data. The visual indicator indicates whether the source of the resource is deceptive ("untrustworthy") or not deceptive ("trustworthy" or "clean"). In many cases, graphical objects are designed to lure users into interact with, or otherwise access, certain resources. Some of these resources may exhibit deceptive or malicious behaviors. In embodiments, when the source of a resource is considered to be deceptive, the visual indicator obfuscates a region of the GUI that includes the graphical object that represents that resource. The GUI allows a user of the user system to un-obfuscate the visual indicator using a graphical pointer or a desired gesture, depending upon the type of user system. In embodiments, when the source of the objects is considered to be trustworthy, the visual indicator visually distinguishes or illuminates a region of the GUI that includes the graphical object. In other words, the embodiments include mechanisms that add indicators directly onto deceptive graphical objects (or "lures") that represent deceptive content items and/or a referenced resource (e.g., a website). These mechanisms add the indicators directly onto the deceptive graphical objects in a frictionless manner (as compared to existing approaches). Other embodiments are described and/or claimed. Referring now to the figures, FIG. 1 shows an arrangement 100 suitable for practicing various embodiments of the present disclosure. As shown in FIG. 1, arrangement 100 includes a client system 105 (also referred to as a "client device", "client system", or the like), network 101, content or service provider system 120, and verification service 140. According to various embodiments, the client system 105 is configured to operate a client application 110 to obtain and render graphical objects 115 (or simply "objects 115") within the client application 110, wherein the client application 110 interacts with the reputation system 140 to obfuscate objects 115 associated with untrustworthy or deceptive resources and/or to illuminate or otherwise highlight objects 115 associated with trustworthy (or "clean") resources. Aspects of these embodiments are discussed in more detail infra.

The client system 105 includes physical hardware devices and software components capable of accessing content and/or services provided by the provider system 120 and reputation system 140. The client system 105 can be implemented as any suitable computing system or other data processing apparatus usable by users to access content/services provided by the provider system 120 and reputation system 140. As examples, the client system 105 can be a desktop computer, a work station, a laptop computer, a mobile cellular phone (e.g., a "smartphone"), a tablet computer, a portable media player, a wearable computing device, or other computing device capable of interfacing directly or indirectly to network 101 or other network. The client system 105 communicates with systems 120 and 140 to obtain content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), or Real-time Streaming Protocol (RTSP); Secure Shell (SSH), Extensible Messaging and Presence Protocol (XMPP); Web Socket; etc.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). As used herein, the term "service" refers to a particular functionality or a set of functions to be performed on behalf of a requesting party, such as the client system 105. As examples, a service may include or involve the retrieval of specified information or the execution of a set of operations. In order to access the content/services, the client system 105 includes components such as processors, memory devices, communication interfaces, and the like.

The provider system 120 includes one or more physical and/or virtualized systems for providing content and/or functionality (i.e., services) to one or more clients (e.g., client system 105) over a network (e.g., network 101). The physical and/or virtualized systems include one or more logically or physically connected servers and/or data storage devices distributed locally or across one or more geographic locations. Generally, the provider system 120 is configured to use IP/network resources to provide web pages, forms, applications, data, services, and/or media content to client system 105. As examples, the provider system 120 may provide search engine services, social networking and/or microblogging services, content (media) streaming services, e-commerce services, cloud analytics services, immersive gaming experiences, and/or other like services. In some embodiments, the provider system 120 may provide on-demand database services, web-based customer relationship management (CRM) services, or the like. In some embodiments, the provider system 120 may also be configured to support communication services such as Voice-over-Internet Protocol (VoIP) sessions, PTT sessions, group communication sessions, and the like for the client system 105 via the network 102.

In order to provide content and/or services to the client system 105, the provider system 120 may operate web servers and/or applications servers. The web server(s) serve static content from a file system of the web server(s), and may generate and serve dynamic content (e.g., server-side programming, database connections, dynamic generation of web documents) using an appropriate plug-in (e.g., a ASP.NET plug-in). The application server(s) implement an application platform, which is a framework that provides for the development and execution of server-side applications as part of an application hosting service. The application platform enables the creation, management, and execution of one or more server-side applications developed by the provider system 120 and/or third party application developers, which allow users and/or third party application developers to access the provider system 120 via respective client systems 105. The client system 105 may operate the client application 110 to access the dynamic content, for example, by sending appropriate HTTP messages or the like, and in response, the server-side application(s) may dynamically generate and provide the objects 115 to the client application 110 to be rendered within the client application 110. The server-side applications may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; and/or any other like technology that renders HyperText Markup Language (HTML). The applications may be built using a platform-specific and/or proprietary development tool and/or programming languages.

Network 101 comprises computers, network connections among various computers (e.g., between the client system 105, verification service 140, and provider system 120), and software routines to enable communication between the computers over respective network connections. In this regard, the network 101 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 101 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 101 may require that the computers execute software routines which enable, for example, the seven layers of the OSI model of computer networking or equivalent in a wireless (or cellular) phone network.

The network 101 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 101 may be associated with network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The reputation system 140 includes one or more verification servers 145, a deceptor database (DB) 150, a trusted resources (TR) DB 155, and a rules DB 160. The DBs 150-160 may be stored in one or more data storage devices or storage systems that act as a repository for persistently storing and managing collections of data according to a predefined database structure. The data storage devices/systems may include one or more primary storage devices, secondary storage devices, tertiary storage devices, non-linear storage devices, and/or other like data storage devices. In some implementations, at least some of the verification servers 145 may implement a suitable database management system (DMS) to execute storage and retrieval of information against various database object(s). The DMS may include a relational database management system (RDBMS), an object database management system (ODBMS), a non-relational database management system, and/or the equivalent. The DBs 150-160 can be implemented as part of a single database, a distributed database, a collection of distributed databases, a database with redundant online or offline backups or other redundancies, etc., and can include a distributed database or storage network. The verification server(s) 145 may utilize a suitable query language to store and retrieve information in/from the DBs 150-160, such as Structure Query Language (SQL), object query language (OQL), non-first normal form query language (N1QL), XQuery, and/or the like. Suitable implementations for the database systems and storage devices are known or commercially available, and are readily implemented by persons having ordinary skill in the art.

The deceptors DB 150 may store data associated with deceptive resources, which are also referred to as "deceptors." For example, the deceptor DB 150 may include a record for each deceptor and fields, such as those shown by table 1.

TABLE 1

| Deceptor DB field types | Description |
| --- | --- |
| Date Added | Date when a deceptor is added to the deceptor DB |
| Resource Type | Type of resource of the deceptor, examples: desktop application, preferred executable format (PEF), web application, mobile app., plug-in, browser extension, bundler, zip file, and document (and format). |
| Status | Indicates whether the deceptor is active or inactive |
| Deceptor Name | Name of the deceptive resource |
| Deceptor Entity | Entity or organization providing or publishing the deceptive resource |
| Version | Version number of the deceptive resource (if applicable) |
| Entity Contacted | Indicates whether the deceptor entity has been notified of the deceptor being listed in the deceptor DB; value may be Boolean or a date of contact |
| Fixed | Indicates whether the deceptive behavior of the deceptor has been remediated |
| Violations | Lists deceptive behaviors of the deceptor; reasons for being included in the deceptor DB |
| Deceptor Sources | Indicates the address or URL of the deceptive resource including, e.g., search methods used to detect the deceptive resource, landing page URI, download URI(s), etc. |
| Deceptive Behavior Metadata | Indicates metadata associated with the deceptor, such as portable execution (PE) information and anti-virus (AV) detection information |
| Resource Metadata | Indicates time and/or date of current and previous evaluations of the deceptive resource, first version deemed deceptive, target OS, target customer, registered advertising networks, return policy, whether the deceptor is monetized, etc. |
| Certification Requirements | Indicates potential requirements for the deceptive resource to be removed from the deceptor DB and/or become a certified (trusted) resource |

TABLE 1-continued

| Deceptor DB field types | Description |
| --- | --- |
| Deceptiveness rank or score | A value indicating the potential deceptiveness of the resource |

The deceptiveness rank or score in table 1 is some value, which may be a number or some other expression, that conveys the deceptiveness of a deceptor as determined by the reputation system 140. The deceptiveness rank/score may be based on the number of rules (which are stored in the rules DB 160) that a given resource violates. For example, a first resource that violates more of these rules than a second resource would have a greater deceptiveness rank/score. Any suitable algorithm may be used to calculate the deceptiveness rank/score, and such algorithms may be chosen based on design choice or empirical analyses.

In addition to data listed by table 1, the deceptor DB 150 may also store relevant content associated with each deceptor. In one example, the deceptor DB 150 may store screenshot images of different aspects of the deceptor, such as landing pages, payment or shopping cart GUI pages, download or installation wizard (or assistant) screens, notification windows, dialog boxes, etc. In another example, the deceptor DB 150 may store captured videos of various interactions with the deceptor, such as going through a checkout process to purchase an executable file, or going through a setup or installation wizard.

The TR DB 155 may store data associated with trusted resources, which are also referred to as "certified resources" or the like. For example, the TR DB 155 may include a record for each deceptor and fields, such as those shown by table 2.

TABLE 2

| TR DB field types | Description |
| --- | --- |
| Date Added | Date when a TR is added to the TR DB |
| Resource Type | Type of resource of the TR, examples: desktop application, PEF, web application, mobile app., plug-in, browser extension, bundler, zip file, and document (and format). |
| Status | Indicates whether the TR is active or inactive |
| TR Name | Name of the resource |
| TR Entity | Entity or organization providing or publishing the TR |
| Version | Version number of the TR (if applicable) |
| Category | Field or usage type of the TR |
| Value Proposition | Indicates promise or value to be delivered by the TR; may be provided by the TR Entity |
| TR Sources | Indicates the address or URL of the TR including, e.g., search methods used to detect the deceptive resource, landing page URI, download URI(s), etc. |
| Certification Metadata | Indicates metadata associated with the TR, such as portable execution (PE) information and anti-virus (AV) detection information |
| Resource Metadata | Indicates time and/or date of certification, certification expiration date, first version certified, target OS, target customer, registered advertising networks, return policy, whether the TR is monetized, etc. |
| Trustworthiness rank or score | A value indicating the potential trustworthiness of the resource |

The trustworthiness rank or score in table 2 is some value, which may be a number or some other expression, that conveys the trustworthiness of a TR as determined by the reputation system 140. The trustworthiness rank/score may be based on the number of certification rules (which are stored in the rules DB 160) that a given TR fulfils. For example, a first resource that complies with more of the certification rules than a second resource would have a greater trustworthiness rank/score. Any suitable algorithm may be used to calculate the trustworthiness rank/score, and such algorithms may be chosen based on design choice or empirical analyses.

In addition to data listed by table 2, the TR DB 155 may also store relevant content associated with each TR. In one example, the TR DB 155 may store screenshot images of different aspects of the TR, such as landing pages, payment or shopping cart GUI pages, download or installation wizard (or assistant) screens, notification windows, dialog boxes, webpages showing value propositions or offers, etc. In another example, the TR DB 155 may store captured videos of various interactions with the TR, such as going through a checkout process to purchase an executable file, or going through a setup or installation wizard.

The rules DB 160 stores any set of constraints and/or standards for evaluating the trustworthiness or deceptiveness of resources. The rules may be generated based on statutes, regulations, standards, etc. promulgated by governmental agencies or regulatory bodies, standards bodies (e.g., Anti-Malware Testing Standards Organization (AMTSO), etc.). In some embodiment, the rules DB 160 stores requirements or standards used to determine whether a resource is deceptive, such as whether a resource installs undisclosed executables, files, or objects; when a resource does not allow a user to opt-out or skip offers made before, during, or after installation; when relationships between different additional executables, files, or objects are not indicated or are not clearly indicated; whether a resource attempts to deceive or mislead users to take any action that was previously declined or cancelled; and the like. In some embodiments, the rules DB 160 stores certification requirements used to assess whether a resource can be considered a trusted resource, such as when the resource only installs disclosed executables, files, or objects; when the user is able to opt-out of offers made before, during, or after installation; the resource gives clear indications of the relationships between different additional executables, files, or objects; when the installation location in standard locations by default; when the resource identifies the name, source, and the actual install date; and the like.

As alluded to previously, the client system 105 is configured to run, execute, or otherwise operate client application 110. The client application 110 is a software application designed to generate and render objects 115, which include various types of content. At least some of the objects 115 include graphical user interfaces (GUIs) and graphical control elements (GCEs) that enable interactions with the provider system 120 and/or reputation system 140. Additionally, the client application 110 may include one or more components, such as verification component 113, to perform specific functions. The verification component 113 is a software component configured to detect deceptive and/or trusted resources, and alter the rendered objects 115 to illuminate trusted resources and/or obfuscate deceptive resources, according to the embodiments discussed herein. The client application 110 and the verification component 113 may be developed using any suitable programming languages and/or development tools, such as those discussed herein or others known in the art.

In some embodiments, the objects 115 may represent a web application that runs inside the client application 110. For example, the client application 110 may be an HTTP client, such as a "web browser" (or simply a "browser") for sending and receiving HTTP messages to and from a web server of the system 120. In this example, the verification component 113 is a browser extension or plug-in configured to allow the client application 110 to render objects 115 with obfuscations to deceptive resources and/or illuminations to trusted resources. Example browsers include WebKit-based browsers, Microsoft's Internet Explorer browser, Microsoft's Edge browser, Apple's Safari, Google's Chrome, Opera's browser, Mozilla's Firefox browser, and/or the like. In another example, the client application 110 may be a desktop or mobile application that runs directly on the client system 105 without a browser, which communicates (sends and receives) suitable messages with the provider system 120. In this example, the verification component 113 is a separate application that communicates with the client application 110 via a suitable API, middleware, software glue, etc., or the verification component 113 is a plug-in configured to allow the client application 110 to render objects 115 with obfuscations to deceptive resources and/or illuminations to trusted resources.

The client application 110 may be platform-specific, such as when the client system 105 is implemented as a mobile device, such as a smartphone, tablet computer, or the like. In these embodiments, the client application 110 may be a mobile web browser, a native (mobile) application specifically tailored to operate on the mobile client system 105, or a hybrid application wherein objects 115 (or a web application) is embedded inside the native (mobile) application 110. In some implementations, the client application 110 and/or the web applications that run inside the client application 110 is/are specifically designed to interact with server-side applications implemented by the application platform of the provider system (discussed infra). In some implementations, the client application 110, and/or the web applications that run inside the client application 110, may be platform-specific or developed to operate on a particular type of client system 105 or a particular (hardware and/or software) client system 105 configuration. The term "platform-specific" may refer to the platform implemented by the client system 105, the platform implemented by the system 120, and/or a platform of a third party system/platform.

In the aforementioned embodiments, the client system 105 implementing the client application 110 is capable of controlling its communications interface(s) to send and receive HTTP messages to/from the provider system 120 and/or reputation system 140, render the aforementioned objects 115 in the client application 110, request connections with other devices, and/or perform (or request performance) of other like functions. The header of these HTTP messages include various operating parameters and the body of the HTTP messages include program code or source code documents (e.g., HTML, XML, JSON, or some other like object(s)/document(s)) to be executed and rendered in the client application 110. The client application 110 executes the program code or source code documents and renders the objects 115 (or web applications) inside the client application 110.

The rendered objects 115 (or executed web application) allows the user of the client system 105 to view content provided by the provider system 120, which may include the results of a requested service, visual representations of data, hyperlinks or links to other resources, and/or the like. The rendered objects 115 also include interfaces for interacting with the provider system 120, for example, to request additional content or services from the provider system 120. In an example, the rendered objects 115 may include a graphical user interface (GUIs), which are used to manage the interactions between the user of the client system 105 and the provider system 120. The GUIs comprise one or more graphical control elements (GCEs) (or widgets) such as buttons, sliders, text boxes, tabs, dashboards, etc. The user of the client system 105 may select or otherwise interact with one or more of the GCEs (e.g., by pointing and clicking using a mouse, or performing a gesture for touchscreen-based systems) to request content or services from the provider system 120.

In some instances, the rendered and displayed objects 115 may include links to other resources from one or multiple sources. Some of these resource may be deceptive resources, which may be in the form of executable code, scripts, active content, cloned websites, and/or the like. A "deceptive resource" or "deceptor" is a resource, application, or service that exhibits deceptive behaviors or practices that may potentially harm users or consumers. A malicious resource (or "malware") is a resource that is intentionally designed to cause damage to a computer system or computer network. Some resources may be considered both deceptive and malicious, and these terms may be used interchangeably throughout the present disclosure. Examples of indicators that indicate deceptive or malicious content or services is discussed infra. Examples of deceptors and/or malware may include adware, scareware, spyware, cloned websites, and the like.

In one example, the provider system 120 is a search engine service and the client application 110 is a browser, and the provider service 120 provides the client system 105 with a search engine results page (SERP) 115 in response to a submitted a search query, where the SERP 115 may include multiple links to other websites. In this example, one or more links in the SERP 115 may lead to malicious resources. In another example, the provider service 120 may be a social networking platform, and the client application 110 may be a native (mobile) application that allows a user of the client system 105 to interact with the social network. In this example, the objects 115 rendered by the client application 110 may include direct messages or emails that include links to deceptive resources.

Malicious resources often attempt to lure users into accessing malicious resources, downloading and installing malware onto their client systems 105, automatically execute malicious program code or scripts, display a content item that carriers a malware payload and executes when the user opens or interacts with the content, and/or lure users into submitting their personal or financial information by posing as legitimate platforms. Deceptive resources, on the other hand, often attempt to lure users into accessing deceptive resources, and/or may simply display deceptive content. In these scenarios, it can be difficult for users to discern malicious or deceptive resources from legitimate (trustworthy) resources since malicious and deceptive resources are often designed to look legitimate. For example, some deceptors are designed as anti-virus or anti-malware applications that fail to indicate unfavorable subscription terms and fees. Furthermore, some users inadvertently navigate to deceptive resources based on human error (e.g., accidentally clicking on a link to a deceptive resource) and/or based on user interfaces errors (e.g., a poorly calibrated touchscreen).

In order to better detect malicious or deceptive resources, the embodiments discussed herein improve upon previous GUIs by dynamically detecting deceptors in obtained web documents and obscuring the deceptors such that the deceptors become automatically obscured to the user. The deceptors may include links or references to deceptive resources, or deceptive content (e.g., text, images, video, etc. that is misleading, deceptive, or malicious) to be rendered in the client application 110. In particular, when the client application 110 obtains a web document, the client application 110 or verification component 113 identifies deceptors in the source code of the web documents, and obfuscates the deceptors by altering the behavior of the rendered objects 115 in the client application 110. The behavior of the rendered objects 115 is only altered when a deceptor is detected in the source code so that the deceptor is obscured from the user's view.

Furthermore, the embodiments also provide that the user may unobscured a deceptor by hovering a cursor over an obscured region of the GUI or performing a gesture over the obscured region. When the user hovers (or performs a desired gesture) over the obscured area, the deceptor is returned to its original format so as to be viewable by the user. In this way, the user can easily identify the deceptor within the client application 110 without having to perform additional tasks (e.g., additional clicks or gestures), which reduces computational complexity and overhead. In these ways, instead of blocking access to the deceptors, which may go against the user's wishes, and instead of waiting for the user to select a deceptor before being warning of the deceptor's deceptiveness ranking, the verification component 113 injects an indicator onto the deceptive resource or deceptive content, which may include search engine search results and advertisements.

Moreover, in some embodiments, the reputation system 140 may rank the deceptive behavior or deceptiveness of different resources, and may assign a deceptiveness rank or grade to each resource. In these embodiments, the reputation system 140 may provide the rank or a suitable scaling factor, which influences the amount of obfuscation to be applied to an individual deceptor. In particular, when the client application 110 or verification component 113 identifies deceptors in a web document's source code, and the client application 110 or verification component 113 increases or decreases the obfuscation applied to the deceptors according to their respective deceptiveness ranks. In this way, the user can easily judge the deceptiveness of individual objects 115 within the client application 110.

Additionally or alternatively, in order to better detect trustworthy (or "clean") resources, some embodiments discussed herein improve upon previous GUIs by dynamically detecting trusted resources (TRs) in web documents or web applications, and automatically illuminating or clarifying the TRs such that the TRs are automatically viewable to the user and distinguished from other content. The TRs may include links or other references to trustworthy resources, or rendered content (e.g., text, images, video, etc.) that is trustworthy (e.g., based on the content itself or by way of a suitable certification). In particular, when the client application 110 obtains a web document, the client application 110 or an verification component 113 identifies TRs in the source code of the web documents, and illuminates the TRs by altering the behavior of the rendered objects 115 in the client application 110. The behavior of the rendered objects 115 is only altered when a TR is detected in the source code so that the TR is better revealed to the user.

Furthermore, the embodiments also provide that the user may return content back to its original format by hovering a cursor over the TR or performing a gesture over the illuminated region within the GUI. When the user hovers (or performs a desired gesture) over the illuminated area, the TR is returned to its original format.

Moreover, in some embodiments, the reputation system 140 may rank the trustworthiness of different resources, and may assign a trustworthy rank or grade to each resource. In these embodiments, the reputation system 140 may provide the rank or a suitable scaling factor, which influences the amount of illumination of visual distinction(s) to be applied to an individual TR. In particular, when the client application 110 or verification component 113 identifies TRs in a web document's source code, and the client application 110 or verification component 113 increases or decreases the clarity applied to the TRs according to their respective trustworthiness ranks. In this way, the user can easily judge the integrity of individual objects 115 within the client application 110.

According to various embodiments, the devices of arrangement 100 may operate as follows: Some or all of the verification servers 145 in the reputation system 140 operates web scrapping algorithms to extract data from various websites, and operates data mining algorithms to identify deceptive or trusted resources from the extracted data. The data mining algorithms may utilize the rules stored in the rules DB 160 in order to determine whether a resource should be considered to be deceptive or trustworthy. Once the resources are determined to be deceptive or trustworthy, the verification servers 145 may control storage of the resources and/or associated data in the deceptors DB 150 or the TR DB 155, respectively. This process may operate on a periodic basis to identify new deceptive or trustworthy resources, and the verification servers 145 may re-evaluate the deceptiveness or trustworthiness of previously identified resources.

Subsequent or concurrent with the web scrapping process, the client system 105 submits a resource request (e.g., a search query, a webpage URL, etc.) through the client application 110, which is sent in an appropriate message (e.g., an HTTP message). In response, the provider service 120 sends an appropriate response message including source code of the requested resource (e.g., a SERP, a web documents for a landing page of the requested URL, etc.). Prior to, during, or after the client application 110 executes the source code and renders objects 115, the verification component 113 analyzes the source code for any deceptive or trusted resources in consultation with the reputation system 140. For example, where the source code includes HTML, the component 113 may search for hyperlink reference attributes ("href") within respective anchor tags ("<a>") and extract the value of the hyperlink reference attributes.

The consultation with the reputation system involves the verification component 113 communicating the identified resources with one or more verification servers 145 in the reputation system 140. Continuing with the previous example, the verification component 113 may send the values extracted from the hyperlink reference attributes to the verification server(s) 145. The communication between the verification component 113 and the verification server(s) 145 may be done through the client application 110 or through separate channel. The verification server(s) 145 obtains the identified resources, and queries the deceptor DB 150 and the TR DB 155 using some or all of the parameters passed from the component 113.

If an identified resource matches an entry in the deceptors DB 150, the verification server(s) 145 responds to the component 113 with a deceptor indicator. The deceptor indicator is a database object or suitable data structure that includes information (e.g., in appropriate data fields or information elements) for obfuscating a graphical object 115 associated with a deceptive resource within a GUI. This information includes or indicates the deceptive resource (e.g., using a resource identifier, URL, or the like) and an intensity of the obfuscation to be applied to the graphical object 115 of the deceptor. In some embodiments, the deceptor indicator may also indicate a type of obfuscation to be applied to the graphical object 115 of the deceptor. In these embodiments, the deceptor indicator may include an obfuscation function to be used for obfuscating the graphical object 115 of the deceptor (e.g., a blurring function, redacting function, or some other function such as those discussed herein) or an index or identifier that refers to the obfuscation function.

In some embodiments, the deceptor indicator may include the previously discussed deceptiveness rank/score to indicate an intensity value for the obfuscation. In some of these embodiments, the component 113 may use the deceptiveness rank/score to calculate an "obfuscation factor" (also referred to as a "blur factor"), which indicates an amount of obfuscation to be applied to the identified resource. The deceptiveness ranking/score increases as the severity of deceptive behavior of the resource increases, which allows the obfuscation factor to increase (or decrease) in relation to that behavior. In some embodiments, the obfuscation factor is a scaling factor, such as a multiplier or percentage, that is used to adjust (i.e., increase or decrease) a default amount of obfuscation. In other embodiments, the verification server(s) 145 may calculate the obfuscation factor based on the deceptiveness rank/score, and may send the obfuscation factor with or in the deceptor indicator. In these embodiments, the obfuscation factor may be an intensity value or percentage.

If an identified resource matches an entry in the TR DB 155, the verification server(s) 145 responds to the component 113 with a trustworthiness indicator. The trustworthiness indicator is a database object or suitable data structure that includes information (e.g., in appropriate data fields or information elements) for illuminating a graphical object 115 associated with a TR within a GUI. This information includes or indicates the TR (e.g., using a resource identifier, URL, or the like) and an intensity of the illumination to be applied to the graphical object 115 of the TR. In some embodiments, the trustworthiness indicator may also indicate a type of illumination to be applied to the graphical object 115 of the TR. In these embodiments, the trustworthiness indicator may include an illumination function to be used for illuminating the graphical object 115 of the TR (e.g., a contrast function, brightness function, an animation to be used, or some other function such as those discussed herein) or an index or identifier that refers to the illumination function.

In some embodiments, the trustworthiness indicator may include the previously discussed trustworthiness rank/score as the intensity value. In some of these embodiments, the component 113 may use the trustworthiness rank/score to calculate an "illumination factor" (also referred to as a "sparkle factor"), which indicates an amount of illumination to be applied to the identified resource. The illumination factor increases as the trustworthy behavior increases, which allows the illumination factor to increase (or decrease) in relation to that behavior. In some embodiments, the illumination factor is a scaling factor, such as a multiplier or percentage, that is used to adjust (i.e., increase or decrease) a default amount of illumination. In other embodiments, the verification server(s) 145 may calculate the illumination factor based on the trustworthiness rank/score, and may send the illumination factor with or in the trustworthiness indicator. In these embodiments, the illumination factor may be an intensity value or percentage.

If an identified resource does not match an entry in the deceptor DB 150 or the TR DB 155, the verification server(s) 145 may respond to the component 113 with a suitable HTTP status code or may not respond to the component 113 at all. In some embodiments, the verification server(s) 145 may provide a deceptiveness ranking/score, a trustworthiness rank/score, or scaling factor that indicates that no obfuscation or illumination should be applied. For example, the verification server(s) 145 may send a deceptor indicator with a value of zero in a deceptiveness ranking/score field or scaling factor field, or may send a trustworthiness indicator with a value of zero in a trustworthiness rank/score field or scaling factor field.

In some embodiments, the component 113, the client application 110, or some other subsystem of the client system 105 may implement a caching mechanism (e.g., a forward position cache system, or client side cache system) to obtain and store resources and deceptor/trustworthiness indicators to avoid unnecessary fetching from the provider system 120 and the reputation system 140 in order to serve existing and/or new user requests more efficiently. In these embodiments, the component 113 and/or the client application 110 may store the indicators in association with cached resources and content. For example, if a back button of the client application 110 is pressed, the local cached version of a previously visited webpage may be displayed instead of a new request being sent to a web server for that webpage. Additionally, any cached deceptor/trustworthiness indicators stored in association with the webpage may be accessed and applied to objects 115 of that webpage.

Additionally or alternatively, the reputation system 140 may also include or implement a caching mechanism (not shown by FIG. 1) to obtain and store deceptor/trustworthiness indicators to avoid unnecessary data querying from the deceptor DB 150 and/or TR DB 155 and to serve the indicators to the component 113 more efficiently. This caching mechanism may be implemented by one or more of the verification servers 145 or a separate dedicate caching system, such as a content delivery network (CDN) or the like. The caching mechanism may include any suitable system, program code, etc. that, upon receipt, temporarily stores deceptor and trustworthiness indicators in a local cache. The caching mechanism may include aspects of web caching mechanisms and DB caching mechanisms. A web caching mechanism may temporarily store web objects, and a DB caching mechanism may temporarily store database objects from the DBs 150-155. In some implementations, various components throughout the delivery path to the client system 105 (e.g., intermediate nodes or hops) may also cache indicators to speed up subsequent requests, subject to the caching policies for the resources 315. As an example, the caching mechanism may cache identified resources obtained from component 113 and specific indicators associated with the identified resources according to certain rules, policies, configurations, etc. In cases where the identified resource embeds, references, or otherwise incorporates one or more external resources (e.g., using the source (src) attribute in a script, embed, image (img), audio, and/or video HTML tags; using the relationship (rel) attribute in the anchor (a), link, and/or area HTML tags; using the open( ) method in Ajax or XMLHttpRequest (XHR); using loadStrings, loadJSON, loadXML, loadTable in p5.js of the Processing programming language; using doc.load (xml); and/or the like), the verification server(s) 145 may identify those external resources, and provide deceptor/trustworthiness indicators of the external resources in a same or similar manner as discussed previously.

In response to receipt of the deceptor indicator, the component 113 obfuscates a visual representation of the identified resource during or after the objects 115 are rendered in the client application 110. When the deceptor indicator includes an obfuscation factor, the component 113 adjusts the amount of obfuscation to be applied to the visual representation of the identified resource. Example user interfaces in accordance with these embodiments are shown and described with regard to FIGS. 2-5.

In response to receipt of the illumination indicator, the component 113 illuminates a visual representation of the identified resource during or after the objects 115 are rendered in the client application 110. When the illumination indicator includes an illumination factor, the component 113 adjusts the amount of illumination to be applied to the visual representation of the identified resource. Example user interfaces in accordance with these embodiments are shown and described with regard to FIGS. 6-10.

Referring now to FIGS. 2-10, which illustrate example interfaces facilitated by a remote system (e.g., provider system 120 and reputation system 140 of FIG. 1) according to various techniques described herein. In particular, each of FIGS. 2-10 illustrate example interfaces that may be displayed on a client system 105 (such as the various GUIs and GCEs discussed previously). The example interfaces of FIGS. 2-10 may be displayed or rendered by the client application 110 and altered by the component 113. While particular example interfaces are illustrated, in various embodiments, other interfaces may be utilized.

FIGS. 2-5 illustrate example user interfaces with obfuscated deceptors, in accordance with various example embodiments. In the example illustrated by FIGS. 2-4, the client application 110 is a browser displaying GUI instance 200, and the and the example illustrated by FIG. 5, the client application 110 is a browser displaying GUI instance 500. GUI instances 200 and 500 include, inter alia, active tab 202*a*, inactive tabs 202*b*, and rendered objects 115*a*-115*g*. The rendered objects 115*a*-*g* include search result objects 115*a*-*d*, text box 115*e*, icon 115*f*, and badge 115*g*. In the example of FIGS. 2-5, the GUI comprises a SERP returned from the provider system 120 (providing search engine services) based on the search query 215 ("Driver commander") input through text box 115*e*. The icon 115*f* in this example is a browser action icon that acts as a button in the browser toolbar. Selecting the icon 115*f*, for example by using pointer 205 to point and click on the icon 115*f*, may cause a pop-up to appear and display content (not shown by FIGS. 2-5). The badge 115*g* is text that is layered over the icon 115*f*. The badge 115*g* may display text based on the actions of the component 113. In the example of FIGS. 2-5, the badge 115*g* displays a number of deceptors that have been detected.

In the example of FIGS. 2-5, the SERP includes search results 115*a*-115*d*, where search result 115*d* has been identified as a deceptor. Each of the search result 115*a*-115*d* is a visual representation of a corresponding resource. For example, search result 115*a* is a visual representation of the resource "www.drivercommander.com," search result 115*b* is a visual representation of the resource "malwarefixes-.com," search result 115*c* is a visual representation of the resource "www.precisesecurity.com," and search result 115*d* is a visual representation of the resource "www.shouldiremoveit.com." The GUI instances 200-400 show the deceptor 115*d* being obfuscated with a blurring effect. Any suitable blurring effect may be used, such as Gaussian blurring, box blurring, Bokeh blurring, or some other blurring effect. In other embodiments, some other obfuscation technique may be used, such as by using an opacity filter (e.g., "opacity(<number-percentage>)" in CSS with a <number-percentage> value under 20%), using a brightness function with a relatively low brightness value (e.g., using the "brightness(<number-percentage>)" in CSS with a <number-percentage> value under 100%), redacting the deceptor 115d or the like.

The blurring effect may be influenced by deceptiveness ranking indicated by a deceptor indicator as mentioned previously. For example, where a Gaussian blur effect is used, each pixel making up or surrounding the deceptor 115d is weighted based on their distance to a center pixel such that pixels that are closer to the center pixel will have a greater weight, and more distant pixels will have a lower weight. In this example, the deceptiveness ranking or deceptor indicator may indicate an average weight to be applied to the pixels making up and/or surrounding the deceptor 115d, or an extent to which the blurring increases or decreases between the center of visual representation of the deceptor 115d and its edges. In this way, the deceptiveness ranking or deceptor indicator may cause the component 113 to produce the blur effect with a specific factor or with a specific intensity distribution or profile.

Figure 2:
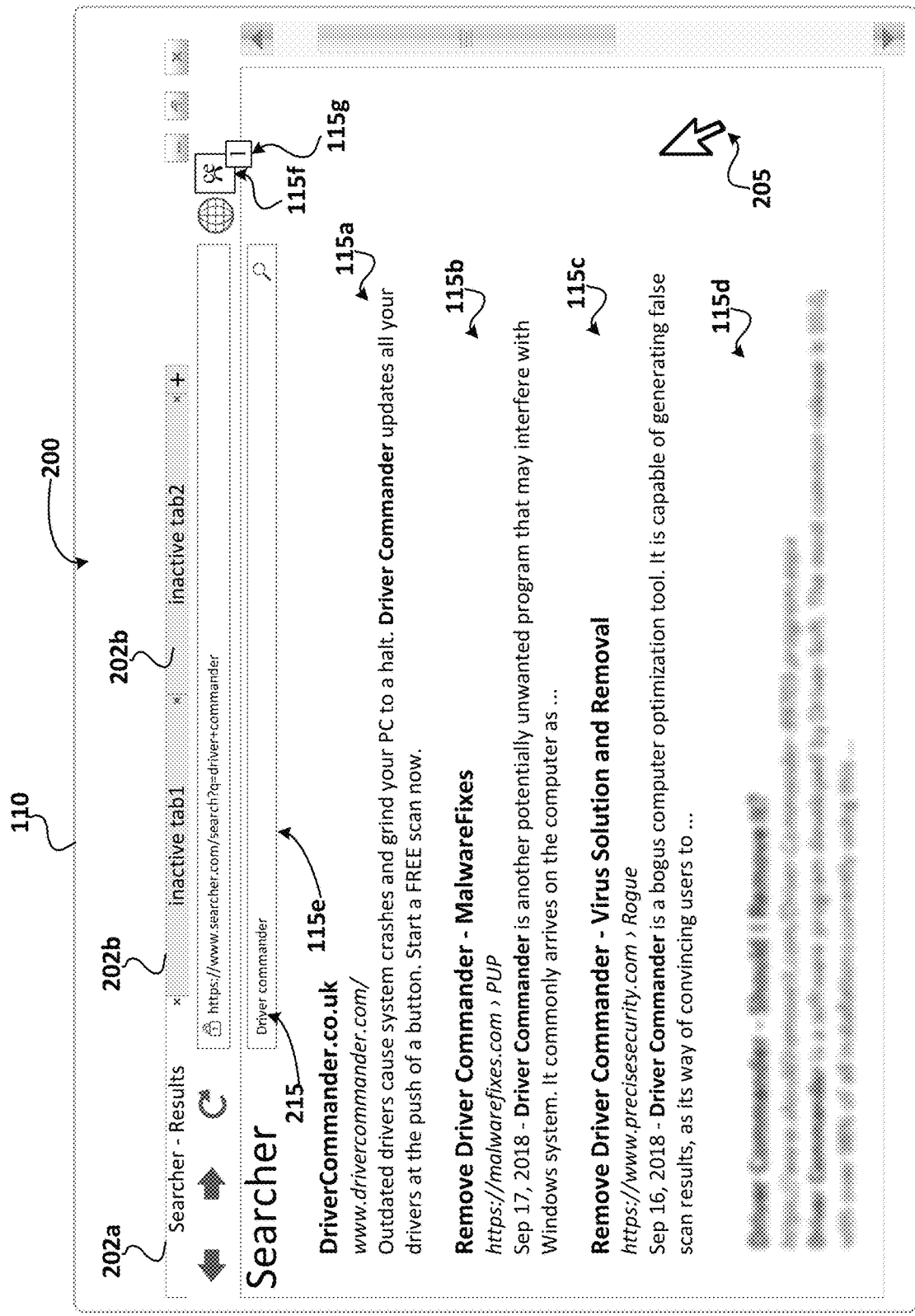
FIGS. 2-10 illustrate example interfaces for generating graphical user interfaces with obfuscated and/or illuminated resources, in accordance with various embodiments.
Figure 3:
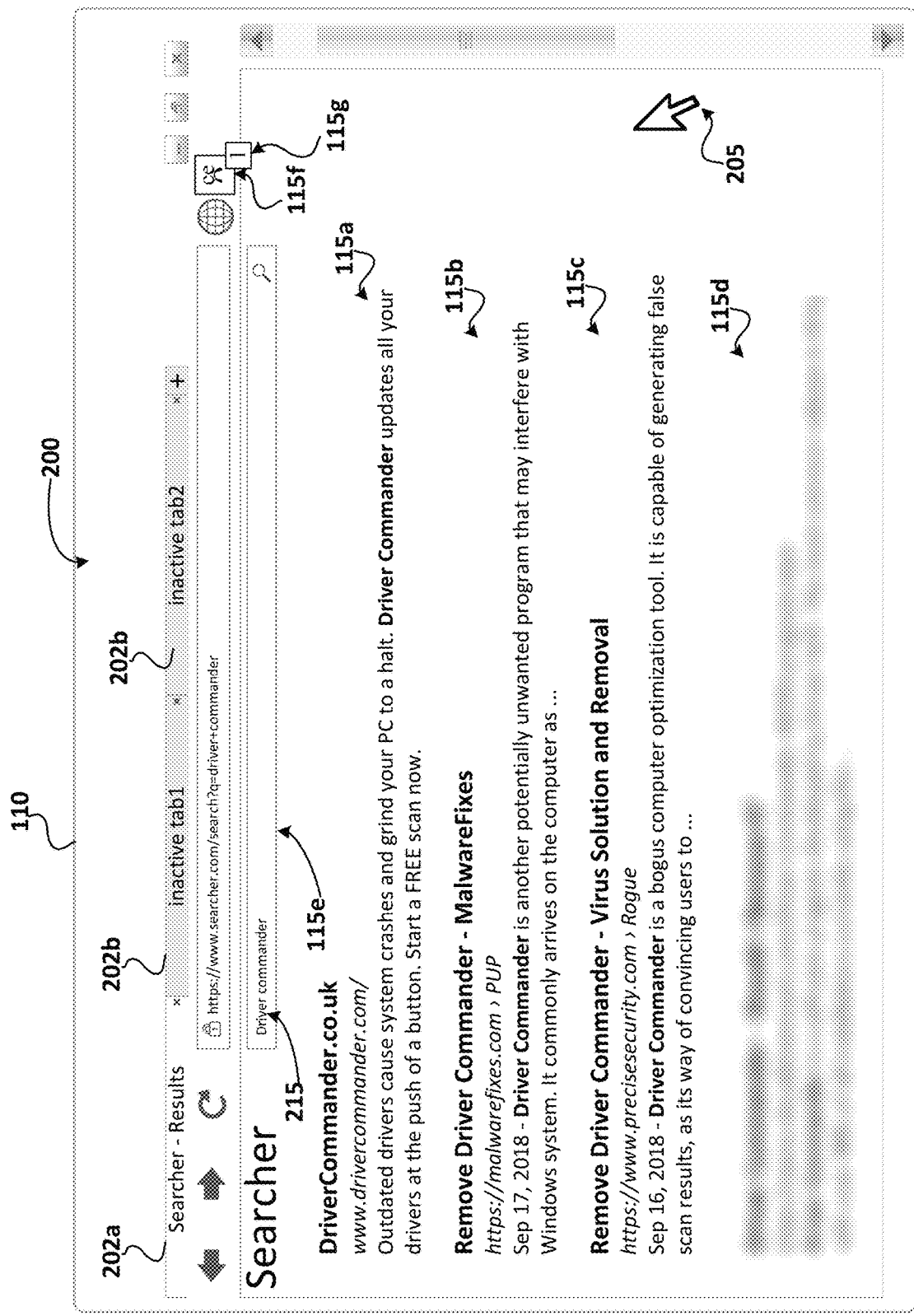
Figure 4:
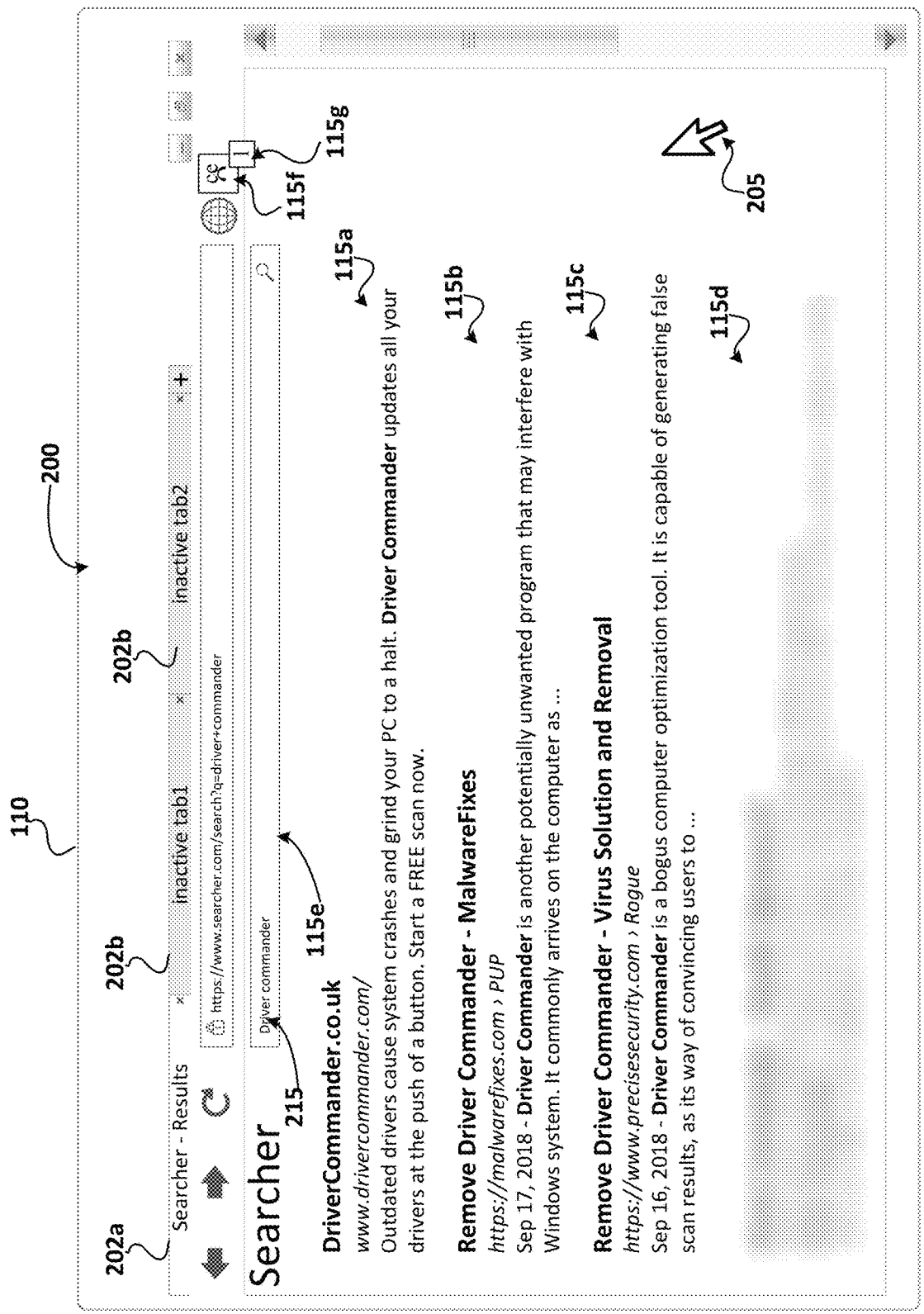

FIGS. 2-4 show examples where different obfuscation intensities are used. At FIG. 2, the component 113 generated or altered the GUI instance 200 such that the deceptor 115d is obfuscated with a 14% blur factor. Consistent with this blur factor, the SERP is displayed with only mild blurring over the visual representation of the deceptor 115d in the GUI instance 200. At FIG. 3, the component 113 generated or altered the GUI instance 200 such that the deceptor 115d is obfuscated with a 30% blur factor. Consistent with this blur factor, the SERP is displayed with more blurring over the visual representation of the deceptor 115d in the GUI instance 200 than that shown by FIG. 2. At FIG. 4, the component 113 generated or altered the GUI instance 200 such that the deceptor 115d is obfuscated with a 40% blur factor. Consistent with this blur factor, the SERP is displayed with substantial blurring over the visual representation of the deceptor 115d in the GUI instance 200 than that shown by FIGS. 2 and 3. The percentage blur factor values in the aforementioned examples may refer to an intensity of the obfuscation, and may be based on the particular implementation used. For example, the CSS blur( ) function takes an input of a number of pixels or a radius length (e.g., "filter: blur(<length>)"), and in these embodiments, the blur factor may be based on a percentage of the number of pixels to be blurred or a percentage of a maximum radius of a perimeter around the deceptor 115d.

Figure 5:
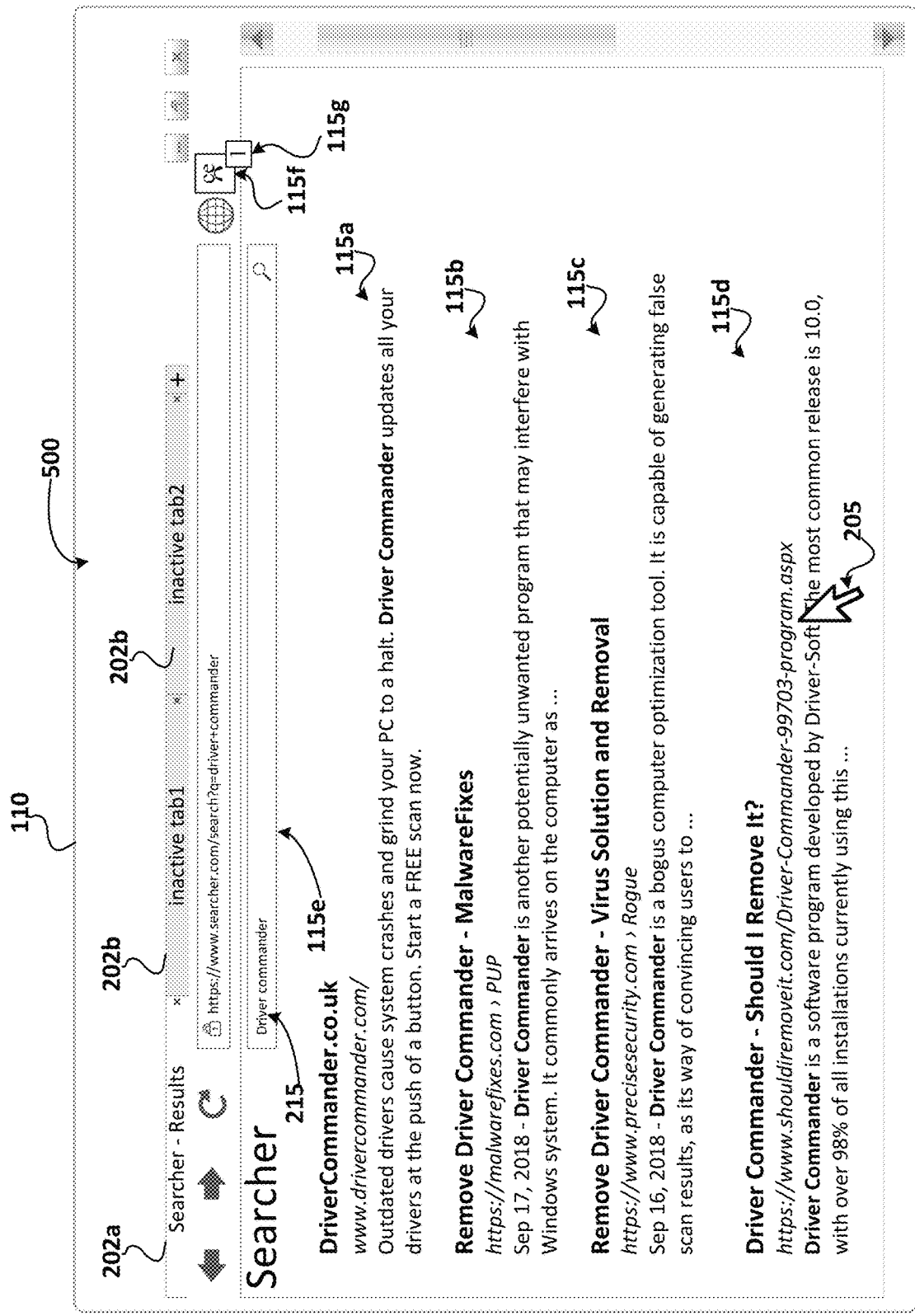

FIG. 5, shows the pointer 205 being moved and/or hovered over the deceptor 115d. In response to the pointer 205 being hovered over the deceptor 115d, the component 113 generates or alters the GUI instance 500 to unobfuscate the deceptor 115d. In embodiments where a touchscreen interface is used, a desired gesture may be defined for removing the obfuscation, such as a tap and hold gesture, a double tap gesture, or the like. In some mobile device implementations, the obfuscated region in the GUI may take up a majority of the screen to increase the likelihood that the user touches the obfuscated region automatically while scrolling through the GUI.

In embodiments, removal of the obfuscation may be done using a suitable optical effect, such as having the obfuscation fade out or fade away or using some sort of animation reveal the deceptor 115d. In the example shown by FIG. 5, an entirety of the deceptor 115d is revealed, however in other embodiments, the deceptor 115d may be partially revealed in response to the pointer 205 being hovered over the deceptor 115. Additionally, the component 113 may return the obfuscation to the deceptor 115d (e.g., by generating the GUI instance 200 as shown by one of FIGS. 2-4) when the user moves the pointer 205 away from the deceptor 115d. In some embodiment, the component 113 may use an optical effect, such as a fade-in or an animation, when (re-)generating the obfuscation. Additionally, a suitable delay may be applied to removal or generation of the obfuscation, which may aid in readability of the deceptor 115d. In some embodiments, the obfuscation may be added or removed from portions of the deceptor 115d as the user moves the pointer 205 across the deceptor 115d, similar to an image reveal slider or the like. In the aforementioned embodiments, the deceptor 115d itself is obfuscated, which is more effective than adding an icon in the address box of the browser or adding an icon next to the deceptive resource itself. Allowing the obfuscation to be removed (or fade away) when the user hovers the pointer 205 over the deceptor 115d is advantageous because it does not require the user to perform any additional clicks (or gestures for touchscreen interfaces) to expose the deceptive resource 115d. In this way, the automatic generation or removal of the obfuscation based on the pointer 205 movement provides the user with a frictionless experience and with no additional computational overhead for creating/rendering additional GUI instances.

Referring now to FIGS. 6-10 illustrate example user interfaces with illuminated TRs, in accordance with various example embodiments. In the example illustrated by FIGS. 6-8, the client application 110 is a browser displaying GUI instance 600, and the and the example illustrated by FIGS. 9-10, the client application 110 is a browser displaying GUI instance 900. GUI instance 600 include, inter alia, active tab 602a, inactive tabs 602b, and rendered objects 115e and 115h-115m. The rendered objects 115 include search result objects 115h-k, text box 115e, icon 1151, and badge 115m. The GUI instance 900 includes the same rendered objects 115 as GUI instance 600 in addition to icon 115n and pop-up window 115o. In the example of FIGS. 6-10, the GUI comprises a SERP returned from the provider system 120 (providing search engine services) based on the search query 216 ("SimpleStar") input through text box 115e. The icon 1151 in this example is a browser action icon that is similar to the icon 115f of FIGS. 2-5, but may have a different image based on TRs being detecting in the SERP. Selecting the icon 1151, for example by using pointer 205 to point and click on the icon 1151, may cause a pop-up to appear and display content (not shown by FIGS. 6-10). The badge 115m is text that is layered over the icon 1151 that displays text based on the actions of the component 113. In the example of FIGS. 6-10, the badge 115m displays a number of TRs that have been detected.

Figure 6:
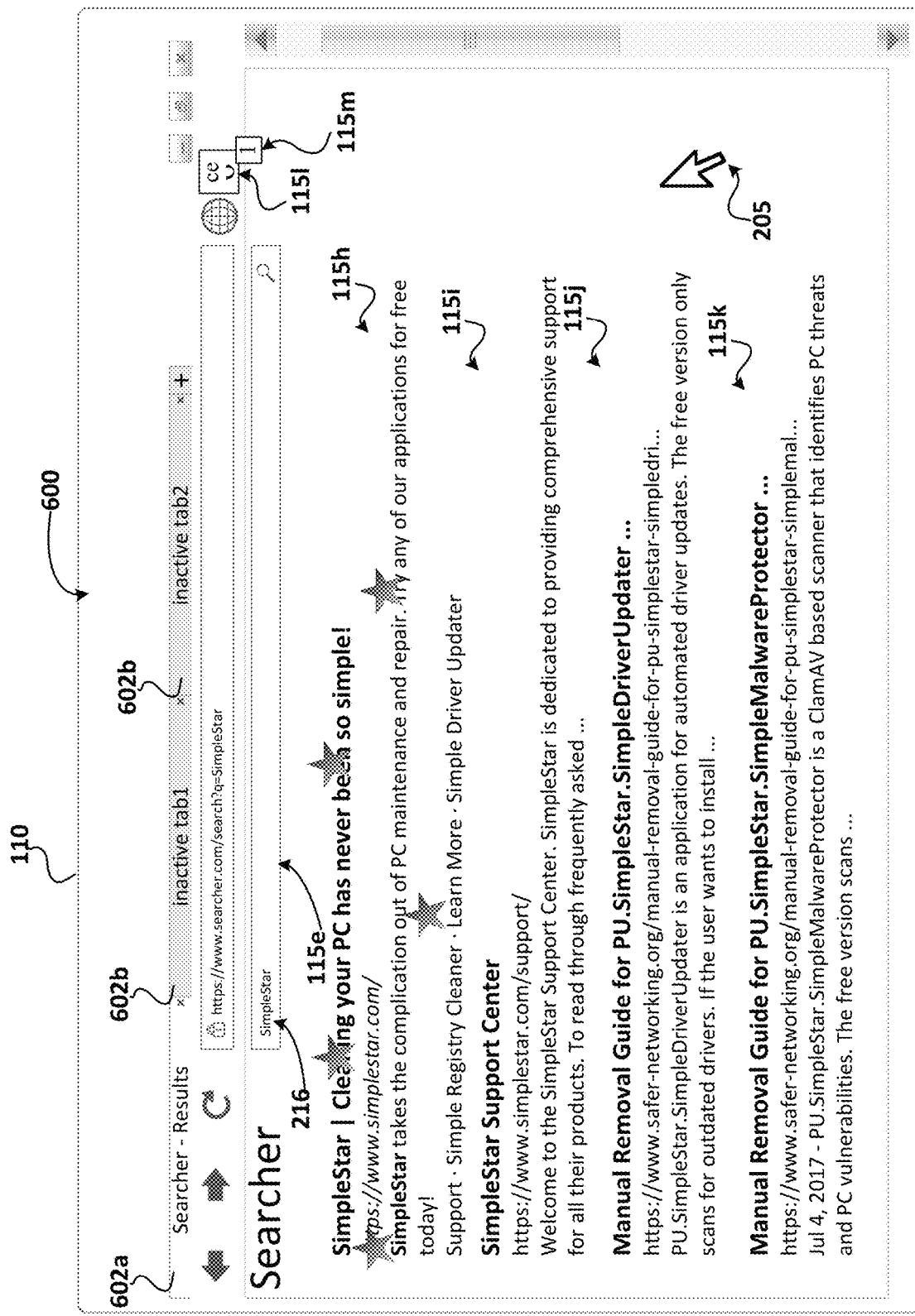
Figure 7:
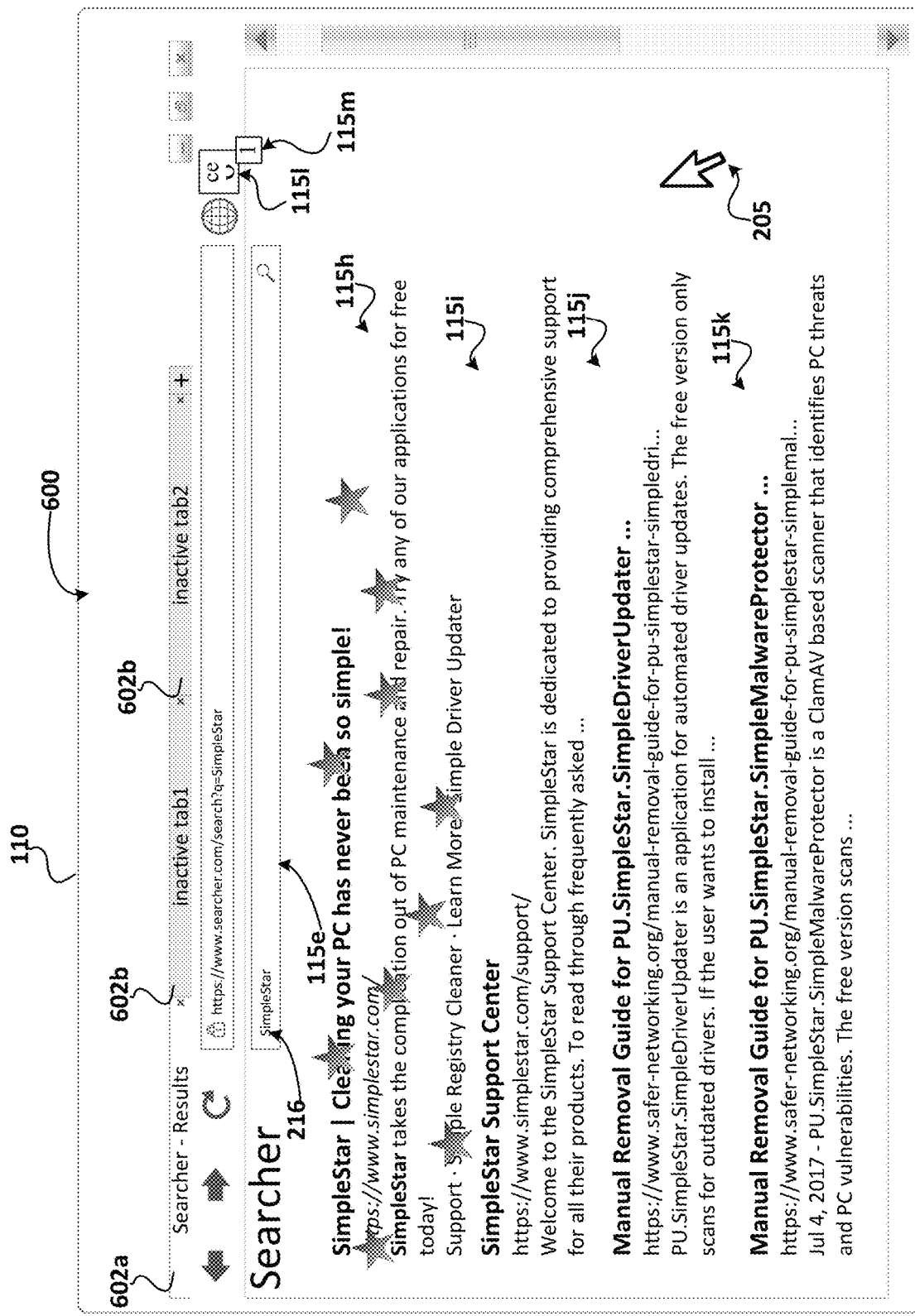
Figure 8:
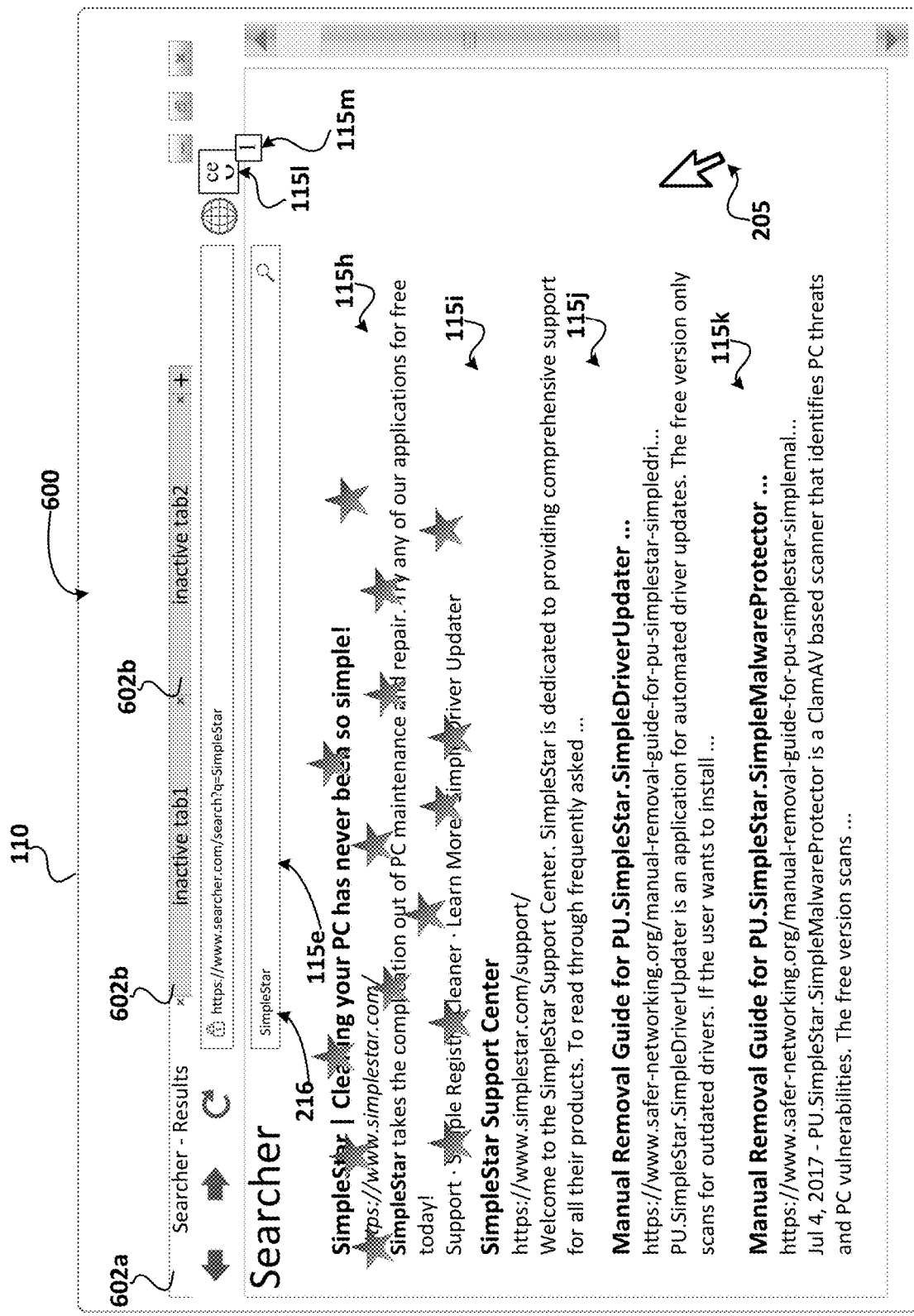

In the example of FIGS. 6-10, the SERP includes search results 115h-115k, where search result 115k has been identified as a TR. Each of the search result 115h-115k is a visual representation of a corresponding resource. For example, search result 115h is a visual representation of the resource "https://www.simplestar.com," search result 115i is a visual representation of the resource "https://www.simplestar.com/support," search result 115j is a visual representation of the resource "https://www.safer-networking.org/manual-removal-guide-for-pu-simplestar-[ . . . ]" and search result 115k is a visual representation of the resource "https://www.safer-networking.org/manual-removal-guide-for-pu-simplestar-[ . . . ]." The GUI instance 600 of FIGS. 6-8 show the TR 115h being illuminated with a number of star images.

Any suitable illumination effect may be additionally or alternatively used, such as using a brightness function (e.g., "brightness( )" in CSS), a contrast function (e.g., "contrast( )" in CSS) with a suitable high contrast value, hue-rotate function (e.g., "hue-rotate( )" in CSS), color inversion function (e.g., "invert( )" in CSS), saturation function (e.g., "saturate( )", a sepia function (e.g., "sepia( )" in CSS), a drop-shadow function (e.g., "drop-shadow( )" in CSS), and/or some other illuminating type of effect(s). In other embodiments, some other illumination technique may be used, such as by overlaying animation(s) on the TR 115h or the like.

The illumination effect may be influenced by trustworthiness ranking indicated by a trustworthiness indicator as mentioned previously. In this example, the trustworthiness ranking or trustworthiness indicator may indicate a number of stars to be overlaid on top of the TR 115h, or a number of stars to be added to or deleted from being overlaid on the visual representation of the TR 115h. Where other illumination effects are used, the trustworthiness ranking or trustworthiness indicator may indicate a number, percentage, length, or some other value depending upon the type of illumination effect that is used. In some of these embodiments, the trustworthiness rank/indicator may also indicate a type of filter function, or combination of filter functions, to be used. Furthermore, these filter functions may be used in combination with a suitable image or animation to be overlaid on the TR 115h. In these ways, the trustworthiness ranking or trustworthiness indicator may cause the component 113 to produce the illumination effect with a specific factor or with a specific intensity distribution or profile.

FIGS. 6-8 show examples where different illumination intensities are used. At FIG. 6, the component 113 generated or altered the GUI instance 600 such that the TR 115h is illuminated or otherwise distinguished with a 5% sparkle factor. Consistent with this sparkle factor, the SERP is displayed with only a mild sparkle over the visual representation of the TR 115h in the GUI instance 600. At FIG. 7, the component 113 generated or altered the GUI instance 600 such that the TR 115h is obfuscated with a 30% sparkle factor. Consistent with this sparkle factor, the SERP is displayed with more sparkle (or stars) over the visual representation of the TR 115h in the GUI instance 600 than that shown by FIG. 6. At FIG. 8, the component 113 generated or altered the GUI instance 600 such that the TR 115h is obfuscated with a 50% sparkle factor. Consistent with this sparkle factor, the SERP is displayed with substantial number of stars over the visual representation of the TR 115h in the GUI instance 600 than that shown by FIGS. 6 and 7. The percentage sparkle factor values in the aforementioned examples may refer to an intensity of the illumination. In other embodiments, the trustworthiness rank/indicator may indicate the number of stars to be overlaid on the TR 115h. In other embodiments, the percentage values of the trustworthiness rank/indicator may indicate a number of pixels (or a percentage of the total number of pixels) to be illuminated on or around the TR 115h. Where other illumination filters are used, the trustworthiness rank/indicator may indicate percentages or other values to be input into a particular filter function.

Figure 9:
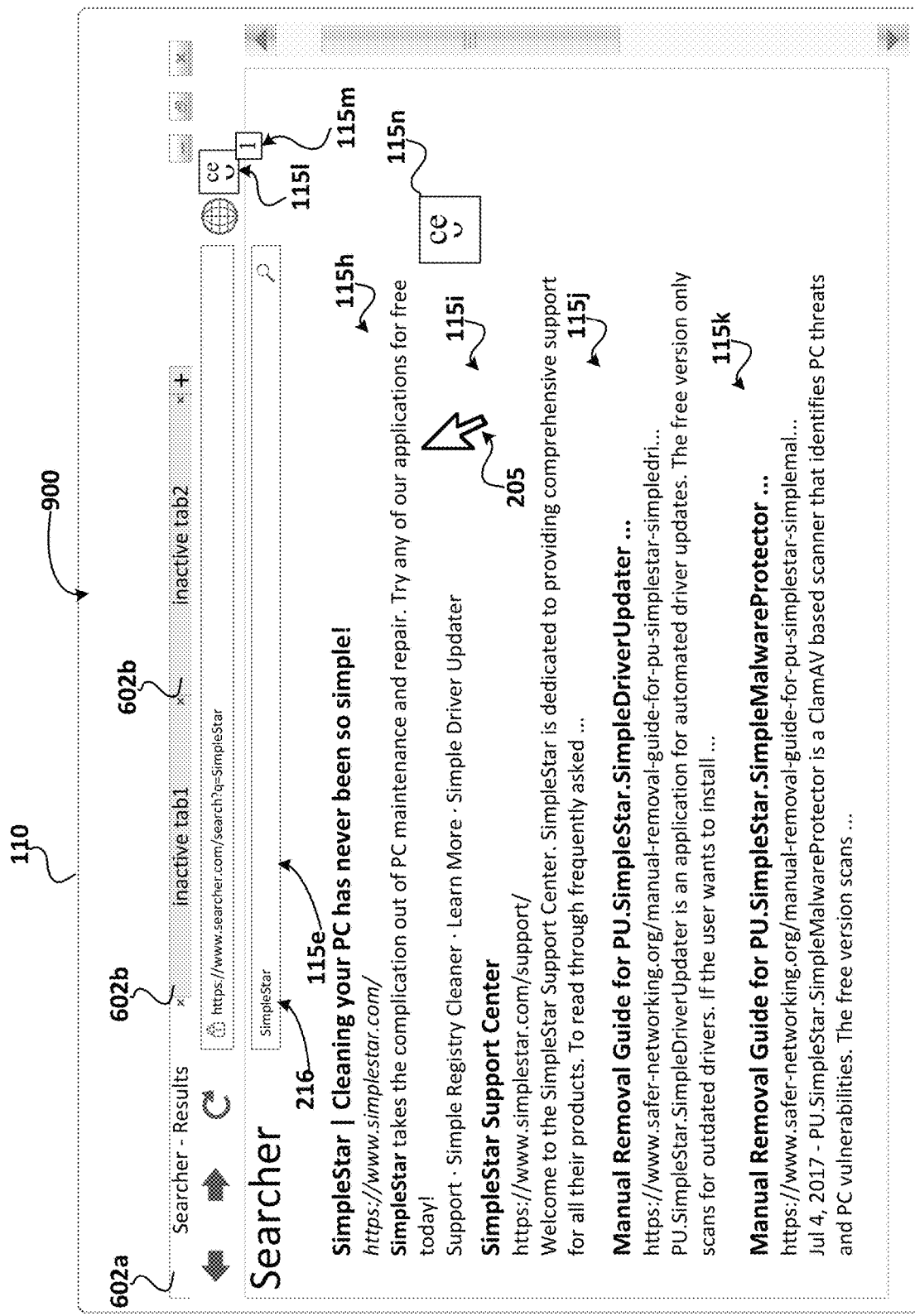

FIG. 9 shows the pointer 205 being moved and/or hovered over the TR 115h. In response to the pointer 205 being hovered over the TR 115h, the component 113 generates or alters the GUI instance 900 to unilluminate (or unsparkle) the TR 115h. In embodiments where a touchscreen interface is used, a desired gesture may be defined for removing the illumination, such as a tap and hold gesture, a double tap gesture, or the like. In some mobile device implementations, the illuminated region in the GUI may take up a majority of the screen to increase the likelihood that the user touches the obfuscated region automatically while scrolling through the GUI.

In embodiments, removal of the illumination may be done using a suitable optical effect, such as having the illumination fade out or fade away or using some sort of animation to remove the illumination from the TR 115h. In the example shown by FIG. 9, an entirety of the illumination is removed from the TR 115h, however in other embodiments, the illumination may be partially removed from the TR 115h in response to the pointer 205 being hovered over the TR 115h. Additionally, the component 113 may return the illumination to the TR 115h (e.g., by generating the GUI instance 600 as shown by one of FIGS. 6-8) when the user moves the pointer 205 away from the TR 115h. In some embodiment, the component 113 may use an optical effect, such as a fade-in or an animation, when (re-)generating the illumination. Additionally, a suitable delay may be applied to removal or generation of the illumination, which may aid in readability of the TR 115h. In some embodiments, the illumination may be added or removed from portions of the TR 115h as the user moves the pointer 205 across the TR 115h, similar to an image reveal slider or the like. In the aforementioned embodiments, the TR 115h itself is illuminated, which is more effective than adding an icon in the address box of the browser or adding an icon next to the trusted resource itself. Allowing the illumination to be removed (or fade away) when the user hovers the pointer 205 over the TR 115h is advantageous because it does not require the user to perform any additional clicks (or gestures for touchscreen interfaces) to expose the TR 115h. In this way, the automatic generation or removal of the illumination based on the pointer 205 movement provides the user with a frictionless experience and with no additional computational overhead for creating/rendering additional GUI instances.

Figure 10:
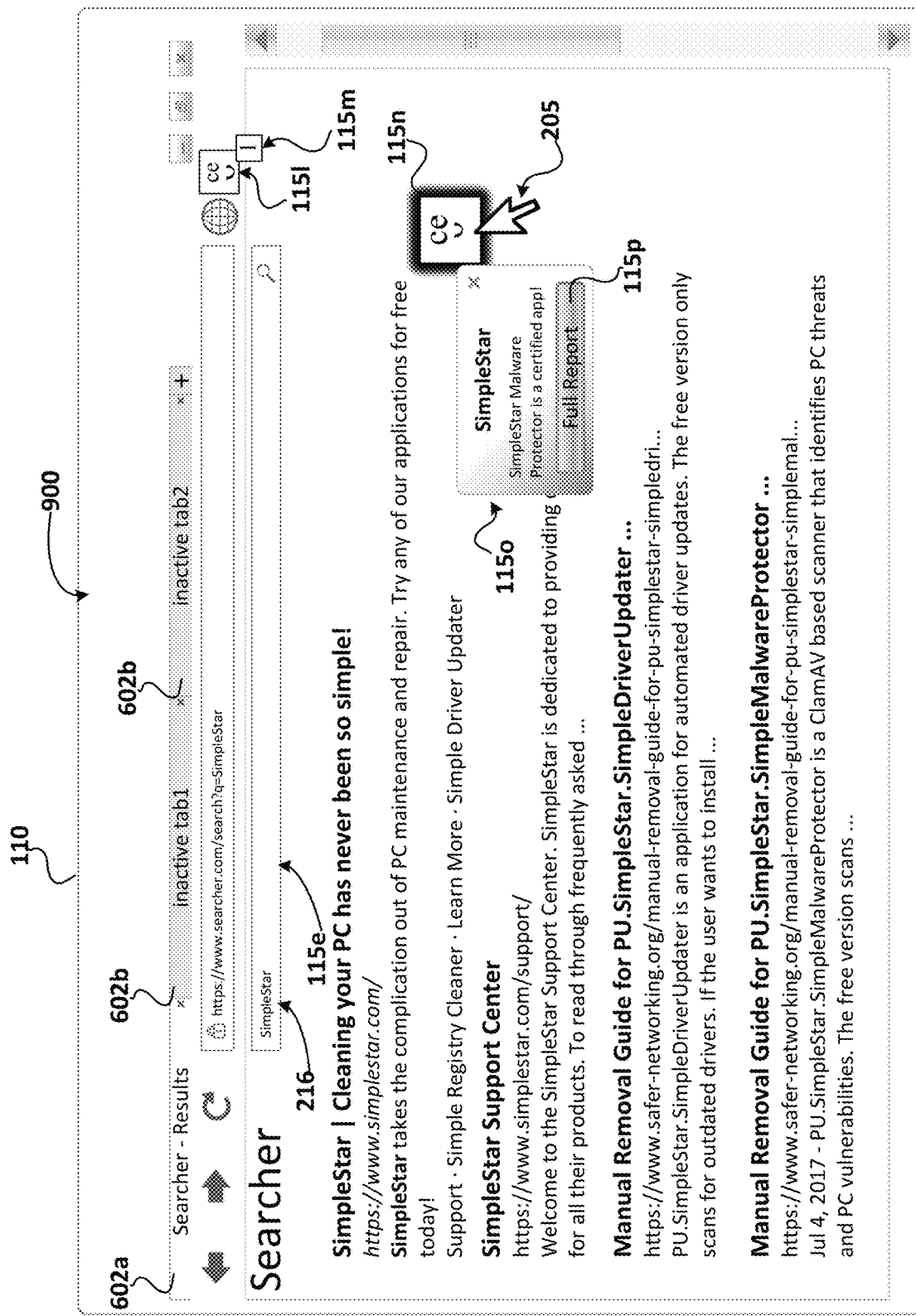

Additionally, as shown by FIG. 9, the icon 115n may be generated and rendered by the component 113 when the user hovers the pointer 205 over the TR 115h. As shown by FIG. 10, when the user moves or hovers the pointer 205 over the icon 115n, the component 113 may cause the icon 115n to be illuminated and may generate and render a pop-up window (or notification window) 115o. The window 115o may provide additional information, and in the embodiment shown by FIG. 10, the window 115o includes a button 115p. When the user selects the button 115p ("Full Report"), the client application 110 may access information indicating how or why the TR 115h is considered to be trustworthy, such as by displaying certification information in the tab 602a or rendered in a new tab 602a/b.

Figure 11:
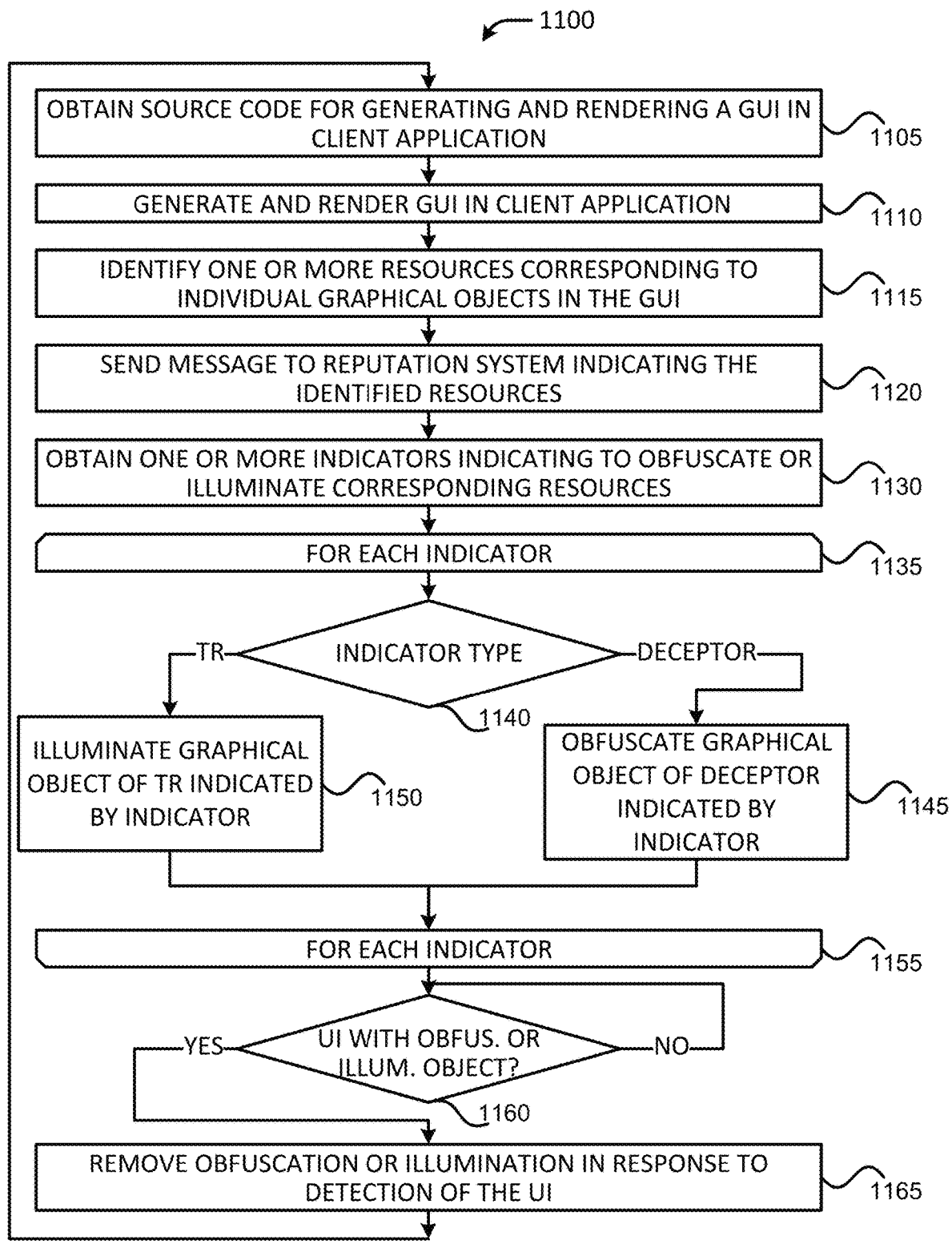
FIG. 11 illustrates an example process for generating an rendering user interfaces in accordance with various embodiments.
Figure 12:
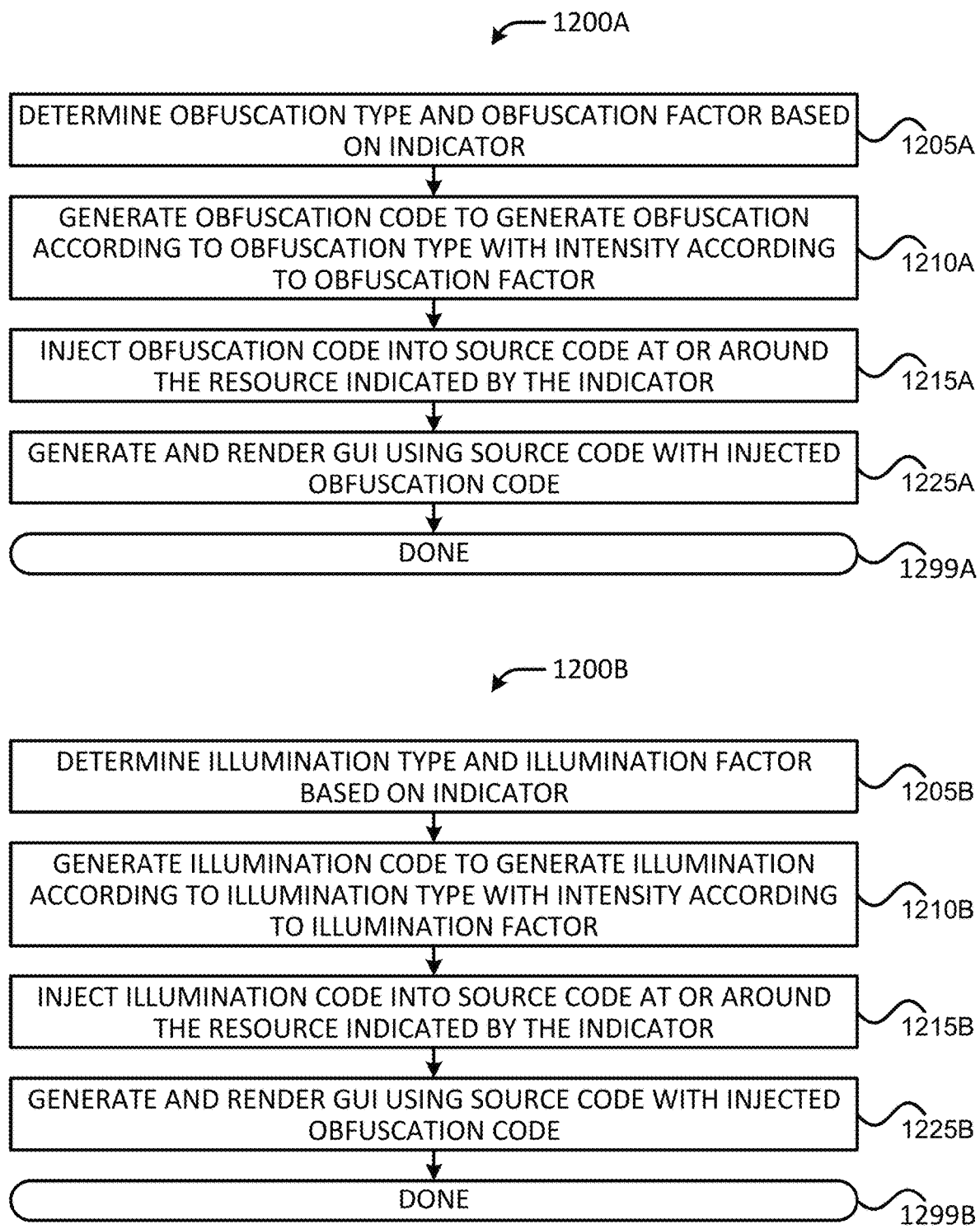
FIG. 12 illustrates an example process for obfuscating deceptive resources and an example process for illuminating trustworthy resources, in accordance with various embodiments.

FIGS. 11-12 illustrate example processes 1100 and 1200A-1200B, respectively, in accordance with various embodiments. For illustrative purposes, the operations of each of processes 1100 and 1200A-1200B are described as being performed by the client application 110 and the component 113 operated by the client system 105 discussed previously with respect to FIG. 1. In embodiments, a processor system of the client system 105 (e.g., processor circuitry 1302 shown by FIG. 13) executes program code of the client application 110 and program code of the component 113 to perform the operations of processes 1100, 1200A, and 1200B. Additionally, a communication system of the client system 105 (e.g., communication circuitry 1309 of FIG. 13) is used to communicate (transmit/receive) messages with the provider system 120 and reputation system 140. While particular examples and orders of operations are illustrated in FIGS. 11-12, in various embodiments, these operations may be re-ordered, broken into additional operations, combined, and/or omitted altogether. Furthermore, in some embodiments the operations illustrated in FIG. 11-12 may be combined with operations described with regard to other example embodiments and/or one or more operations described with regard to the non-limiting examples provided herein.

Referring now to FIG. 11, an example process 1100 for generating and rendering a GUI according to various embodiments, is shown. Process 1100 begins at operation 1105, where the client application 110 obtains source code for generating a GUI in the client application 110. At operation 1110, the client application 110 generates and renders the GUI in the client application 110. At operation 1115, the component 113 identifies one or more resources corresponding to individual graphical objects 115 in the GUI.

At operation 1120, the component 113 generates a message to indicate the identified resources, and sends the message to the reputation system 140 using. The message may be any suitable message, such as those discussed herein. At operation 1125, the component 113 obtains one or more indicators from the reputation system 140, which indicate corresponding resources to be obfuscated or illuminated. The one or more indicators may be contained in a suitable message, such as those discussed herein.

At open loop operation 1135, the component 113 processes each of the one or more indicators, in turn. At operation 1140, the component determines an indicator type of an indicator. As mentioned previously, the indicator may be a deceptor indicator (or "obfuscation indicator") or a TR indicator (or "illumination indicator"). If at operation 1140 the component 113 determines that the indicator is a deceptor indicator, the component 113 proceeds to operation 1145 to obfuscate a graphical object 115 associated with a deceptor resource indicated by the indicator. Process 1200A of FIG. 12 is an example process for obfuscating a deceptive resource, which is discussed in more detail infra. If at operation 1140 the component 113 determines that the indicator is a TR indicator, the component 113 proceeds to operation 1150 to illuminate a graphical object 115 associated with a trusted resource indicated by the indicator. Process 1200B of FIG. 12 is an example process for illuminating a trusted resource, which is discussed in more detail infra. At operation 1155, the component 113 proceeds back to operation 1135 to process a next indicator, if any.

At operation 1160, the component 113 determines whether a user interaction (UI) has been detected with an obfuscated or illuminated object. In one example, the component 113 may detect a UI by executing the HTML/CSS functions hover( ) or mouseover( ) when the client system 105 includes a mouse input device. In another example, the component 113 may detect a UI through the TouchEvent interface (or executing TouchEvent( ) function to create TouchEvent objects) when the client system includes a touch interface (e.g., a touchscreen or touchpad). In this example, the UI could be detected by measuring a time between a "touchstart" event and a "touchend" event. Other methods for detecting UIs with the obfuscated and illuminated objects 115 may be used in other embodiments. If at operation 1160, the component 113 does not detect a UI with an obfuscated or illuminated object 115, then the component 113 loops back to continue to monitor for UIs with the obfuscated or illuminated objects 115. If at operation 1160, the component 113 does detect a UI with an obfuscated or illuminated object 115, then the component 113 proceeds to operation 1165 to remove the obfuscation or illumination in response to the detection of the UI. After performance of operation 1165, the process may end or repeat as necessary.

Referring now to FIG. 12, an example process 1200A for obfuscating deceptors according to various embodiments and an example process 1200A for illuminating trusted resources according to various embodiments, are shown. In embodiments, process 1200A may correspond to operation 1145 of process 1100 shown and described with respect to FIG. 11, and process 1200B may correspond to operation 1150 of process 1100 shown and described with respect to FIG. 11. Additionally, processes 1200A and 1200B may encompass aspects of operations 1160-1165 of process 1100.

Process 1200A begins at operation 1205A where the component determines an obfuscation type and obfuscation factor included in a received deceptor indicator. The deceptor indicator may also identify the deceptor using a URL or resource identifier. At operation 1210A, the component 113 generates obfuscation code based on the obfuscation type and obfuscation factor. The obfuscation code is used to obfuscate the graphical object 115 that corresponds to the deceptor according to the obfuscation type and with an intensity according to the obfuscation factor. In embodiments, the obfuscation code may also include code for removing the obfuscation from the graphical object 115 of the deceptor in response to a defined UI with the graphical object 115.

At operation 1215A, the component injects the obfuscation code into source code used for generating the GUI in or around the deceptor. For example, where the GUI is a SERP and the deceptor is a search result in the SERP, the component 113 may search for a link or reference to the deceptor in the source code of the SERP using a URL in the deceptor indicator, such as by analyzing the source code for hyperlink reference attributes ("href") within respective anchor tags ("<a>"). Once found, the component 113 may insert the obfuscation code before and/or after the link or reference to the deceptor, such by inserting appropriate division or section tags ("<div>") or span tags ("<span>") around the anchor tags including hyperlink references to the deceptor. The division, section or span tags may include attributes or identifiers used to indicate where the obfuscation should be applied. In another example, the component 113 may execute the obfuscation code to alter the anchor tags themselves such that the anchor tags including a hyperlink reference to the deceptor are obfuscated when the GUI is rendered. Additionally, the obfuscation code may include instructions for removing the obfuscation upon detection of a desired UI with the graphical object 115 of the deceptor. These instructions may correspond to operations 1160-1165 of process 1100. At operation 1225A, the client application 110 generates and renders the GUI using source code injected with the obfuscation code. After completion of operation 1225A, the component 113 may proceed to operation 1299A to return back to perform process 1100 or end.

Process 1200B begins at operation 1205B where the component determines an illumination type and illumination factor included in a received trustworthiness indicator. The trustworthiness indicator may also identify the TR using a URL or resource identifier. At operation 1210B, the component 113 generates illumination code based on the illumination type and illumination factor. The illumination code is used to illuminate the graphical object 115 that corresponds to the TR according to the illumination type and with an intensity according to the illumination factor. In embodiments, the illumination code may also include code for removing the illumination from the graphical object 115 of the TR in response to a defined UI with the graphical object 115.

At operation 1215B, the component injects the illumination code into source code used for generating the GUI in or around the TR. For example, where the GUI is a SERP and the TR is a search result in the SERP, the component 113 may search for a link or reference to the TR in the source code of the SERP using a URL in the trustworthiness indicator, such as by analyzing the source code for hyperlink reference attributes ("href") within respective anchor tags ("<a>"). Once found, the component 113 may insert the illumination code before and/or after the link or reference to the TR, such by inserting appropriate division or section tags ("<div>") or span tags ("<span>") around the anchor tags including hyperlink references to the TR. The division, section or span tags may include attributes or identifiers used to indicate where the illumination should be applied. In another example, the component 113 may execute the illumination code to alter the anchor tags themselves such that the anchor tags including a hyperlink reference to the TR are illuminated when the GUI is rendered. Additionally, the illumination code may include instructions for removing the illumination upon detection of a desired UI with the graphical object 115 of the TR. These instructions may correspond to operations 1160-1165 of process 1100. At operation 1225B, the client application 110 generates and renders the GUI using source code injected with the illumination code. After completion of operation 1225B, the component 113 may proceed to operation 1299B to return back to perform process 1100 or end.

Figure 13:
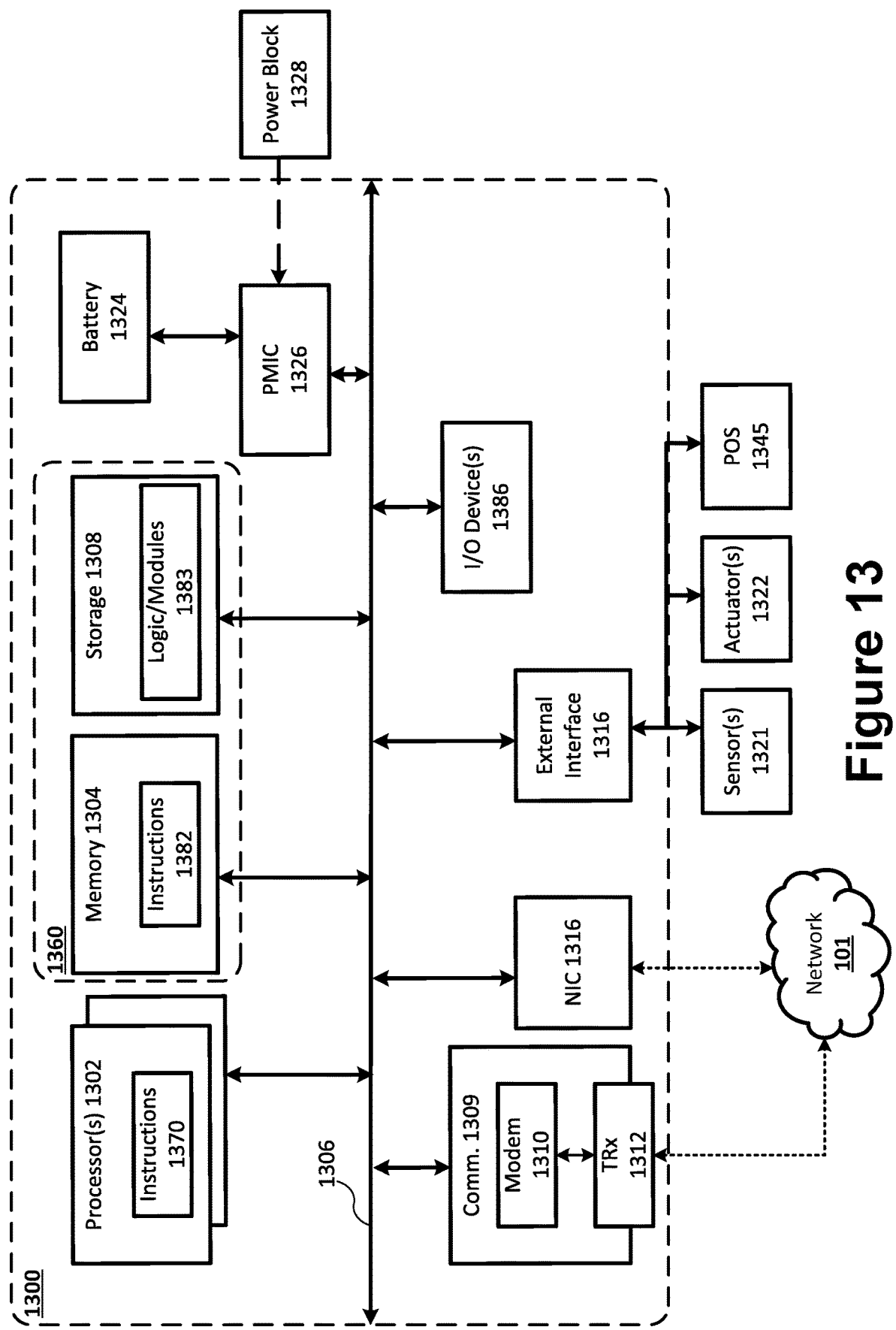
FIG. 13 illustrates an example computing system suitable for practicing various aspects of the present disclosure in accordance with various embodiments.

FIG. 13 illustrates an example of an computing system 1300 (also referred to as "platform 1300," "device 1300," "appliance 1300," or the like) in accordance with various embodiments. The system 1300 may be suitable for use as any of the computer devices discussed herein, such as client system 105, a server of the provider system 120, or a verification server 145. The components of system 1300 may be implemented as an individual computer system, or as components otherwise incorporated within a chassis of a larger system. The components of system 1300 may be implemented as integrated circuits (ICs) or other discrete electronic devices, with the appropriate logic, software, firmware, or a combination thereof, adapted in the computer system 1300. Additionally or alternatively, some of the components of system 1300 may be combined and implemented as a suitable System-on-Chip (SoC), System-in-Package (SiP), multi-chip package (MCP), or the like.

The system 1300 includes processor circuitry 1302, which is configured to execute program code, and/or sequentially and automatically carry out a sequence of arithmetic or logical operations; record, store, and/or transfer digital data. The processor circuitry 1302 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 1302 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1302 may include, for example, one or more processor cores (CPUs), one or more graphics processing units (GPUs), one or more reduced instruction set computing (RISC) processors, one or more Acorn RISC Machine (ARM) processors, one or more complex instruction set computing (CISC) processors, one or more DSPs, one or more programmable logic devices (PLDs), one or more FPGAs, ASICs one or more microprocessors or controllers, or any suitable combination thereof. Individual processors (or individual processor cores) of the processor circuitry 1302 may be coupled with or may include memory/storage and may be configured to execute instructions stored in the memory/storage to enable various applications or operating systems to run on the system 1300. In these embodiments, the processors (or cores) of the processor circuitry 1302 are configured to operate application software (e.g., client application 110 and component 113) to provide specific services to a user of the system 1300. In some embodiments, the processor circuitry 1302 may include special-purpose processor/controller to operate according to the various embodiments herein.

As examples, the processor circuitry 1302 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A5-12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; or the like. Other examples of the processor circuitry 1302 may be mentioned elsewhere in the present disclosure.

In some implementations, such as when system 1300 is part of a server computer system, the processor circuitry 1302 may include one or more hardware accelerators. The hardware accelerators may be microprocessors, configurable hardware (e.g., field-programmable gate arrays (FPGAs), programmable Application Specific Integrated Circuits (ASICs), programmable SoCs, digital signal processors (DSP), etc.), or some other suitable special-purpose processing device tailored to perform one or more specific tasks. The hardware accelerators may be hardware devices that perform various functions that may be offloaded from an one or more processors of the processor circuitry 1302. In these embodiments, the circuitry of processor circuitry 1302 may comprise logic blocks or logic fabric including and other interconnected resources that may be programmed to perform various functions, such as the procedures, methods, functions, etc. of the various embodiments discussed herein. Additionally, the processor circuitry 1302 may include memory cells (e.g., EPROM, EEPROM, flash memory, static memory (e.g., SRAM, anti-fuses, etc.) used to store logic blocks, logic fabric, data, etc. in LUTs and the like.

The system memory circuitry 1304 comprises any number of memory devices arranged to provide primary storage from which the processor circuitry 1302 continuously reads instructions 1382 stored therein for execution. In some embodiments, the memory circuitry 1304 is on-die memory or registers associated with the processor circuitry 1302. As examples, the memory circuitry 1304 may include volatile memory such as random access memory (RAM), dynamic RAM (DRAM), synchronous DRAM (SDRAM), etc. The memory circuitry 1304 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 1304 may also comprise persistent storage devices, which may be temporal and/or persistent storage of any type, including, but not limited to, non-volatile memory, optical, magnetic, and/or solid state mass storage, and so forth.

Storage circuitry 1308 is arranged to provide persistent storage of information such as data, applications, operating systems (OS), and so forth. As examples, the storage circuitry 1308 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 1302, resistance change memories, phase change memories, holographic memories, or chemical memories, and the like.

The storage circuitry 1308 is configured to store computational logic 1383 (or "modules 1383") in the form of software, firmware, microcode, or hardware-level instructions to implement the techniques described herein. The computational logic 1383 may be employed to store working copies and/or permanent copies of programming instructions for the operation of various components of system 1300 (e.g., drivers, libraries, application programming interfaces (APIs), etc.), an OS of system 1300, one or more applications, and/or for carrying out the embodiments discussed herein (such as one or more operations of processes 1100, 1200A, and 1220B of FIGS. 11-12). The computational logic 1383 may be stored or loaded into memory circuitry 1304 as instructions 1382, which are then accessed for execution by the processor circuitry 1302 to carry out the functions described herein. The various elements may be implemented by assembler instructions supported by processor circuitry 1302 or high-level languages that may be compiled into instructions 1370 to be executed by the processor circuitry 1302. The permanent copy of the programming instructions may be placed into persistent storage devices of storage circuitry 1308 in the factory or in the field through, for example, a distribution medium (not shown), through a communication interface (e.g., from a distribution server (not shown)), or over-the-air (OTA).

The operating system (OS) of system 1300 may be a general purpose OS or an OS specifically written for and tailored to the computing system 1300. For example, when the system 1300 is a server system or a desktop or laptop client system 105, the OS may be Unix or a Unix-like OS such as Linux e.g., provided by Red Hat Enterprise, Windows10™ provided by Microsoft Corp.®, macOS provided by Apple Inc.®, or the like. In another example where the system 1300 is a mobile device, the OS may be a mobile OS, such as Android® provided by Google iOS® provided by Apple Inc.®, Windows 10 Mobile® provided by Microsoft Corp.®, KaiOS provided by KaiOS Technologies Inc., or the like.

The OS manages computer hardware and software resources, and provides common services for various applications (e.g., application 110). The OS may include one or more drivers or APIs that operate to control particular devices that are embedded in the system 1300, attached to the system 1300, or otherwise communicatively coupled with the system 1300. The drivers may include individual drivers allowing other components of the system 1300 to interact or control various I/O devices that may be present within, or connected to, the system 1300. For example, the drivers may include a display driver to control and allow access to a display device, a touchscreen driver to control and allow access to a touchscreen interface of the system 1300, sensor drivers to obtain sensor readings of sensor circuitry 1321 and control and allow access to sensor circuitry 1321, actuator drivers to obtain actuator positions of the actuators 1322 and/or control and allow access to the actuators 1322, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 1300.

In an example, the instructions 1382 provided via the memory circuitry 1304 and/or the storage circuitry 1308 are embodied as a non-transitory, machine-readable medium S60 including code to direct the processor circuitry 1302 to perform electronic operations in the system 1300. The processor circuitry 1302 accesses the non-transitory machine-readable medium 1160 over the interconnect (IX) 1306. For instance, the non-transitory, machine-readable medium 1160 may be embodied by devices described for the storage circuitry 1308 of FIG. 11 or may include specific storage units such as optical disks, flash drives, or any number of other hardware devices. The non-transitory, machine-readable medium 1160 may include instructions 1382 to direct the processor circuitry 1302 to perform a specific sequence or flow of actions, for example, as described with respect to the flowchart(s) and block diagram(s) of operations and functionality depicted previously (see e.g., FIGS. 11-12). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

The computer program code for carrying out operations of the present disclosure (e.g., computational logic 1383, instructions 1382, 1370, etc.) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), PHP, Pearl, Python, Ruby or Ruby on Rails, Accelerated Mobile Pages Script (AMPscript), VBScript, and/or the like; a markup language such as HTML, XML, wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein. The computer program code for carrying out operations of the present disclosure may also be written in any combination of the programming languages discussed herein. The program code may execute entirely on the system 1300, partly on the system 1300 as a stand-alone software package, partly on the system 1300 and partly on a remote computer, or entirely on the remote computer. In the latter scenario, the remote computer may be connected to the system 1300 through any type of network (e.g., network 101).

The components of system 1300 communicate with one another over the interconnect (IX) 1306. The IX 1306 may include any number of IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 1306 may be a proprietary bus, for example, used in a SoC based system.

The communication circuitry 1309 is a hardware element, or collection of hardware elements, used to communicate over one or more networks (e.g., network 101) and/or with other devices. The communication circuitry 1309 includes modem 1310 and transceiver circuitry ("TRx") 1312. The modem 1310 includes one or more processing devices (e.g., baseband processors) to carry out various protocol and radio control functions. Modem 1310 may interface with application circuitry of system 1300 (e.g., a combination of processor circuitry 1302 and CRM 1360) for generation and processing of baseband signals and for controlling operations of the TRx 1312. The modem 1310 may handle various radio control functions that enable communication with one or more radio networks via the TRx 1312 according to one or more wireless communication protocols. The modem 1310 may include circuitry such as, but not limited to, one or more single-core or multi-core processors (e.g., one or more baseband processors) or control logic to process baseband signals received from a receive signal path of the TRx 1312, and to generate baseband signals to be provided to the TRx 1312 via a transmit signal path. In various embodiments, the modem 1310 may implement a real-time OS (RTOS) to manage resources of the modem 1310, schedule tasks, etc.

The communication circuitry 1309 also includes TRx 1312 to enable communication with wireless networks using modulated electromagnetic radiation through a non-solid medium. TRx 1312 includes a receive signal path, which comprises circuitry to convert analog RF signals (e.g., an existing or received modulated waveform) into digital baseband signals to be provided to the modem 1310. The TRx 1312 also includes a transmit signal path, which comprises circuitry configured to convert digital baseband signals provided by the modem 1310 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 1312 using metal transmission lines or the like.

The TRx 1312 may include one or more radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoW-PAN), WirelessHART, MiWi, Thread, I600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LP-WAN), LoRaWAN™ (Long Range Wide Area Network), Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 1311, 1312 including, for example, radios compliant with standards issued by the ITU (International Telecommunication Union), or the ETSI (European Telecommunications Standards Institute), among others, both existing and not yet formulated.

Network interface circuitry/controller (NIC) 1316 may be included to provide wired communication to the network 101 or to other devices, such as the mesh devices 1364 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 1300 via NIC 1316 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1316 may include one or more dedicated processors and/or FPGAs to communicate using one or more of the aforementioned network interface protocols. In some implementations, the NIC 1316 may include multiple controllers to provide connectivity to other networks using the same or different protocols. For example, the system 1300 may include a first NIC 1316 providing communications to the cloud over Ethernet and a second NIC 1316 providing communications to other devices over another type of network. In some implementations, the NIC 1316 may be a high-speed serial interface (HSSI) NIC to connect the system 1300 to a routing or switching device.

The external interface 1318 (also referred to as "I/O interface circuitry" or the like) is configured to connect or coupled the system 1300 with external devices or subsystems. The external interface 1318 may include any suitable interface controllers and connectors to couple the system 1300 with the external components/devices. As an example, the external interface 1318 may be an external expansion bus (e.g., Universal Serial Bus (USB), FireWire, Thunderbolt, etc.) used to connect system 100 with external (peripheral) components/devices. The external devices include, inter alia, sensor circuitry 1321, actuators 1322, and positioning circuitry 1345, but may also include other devices or subsystems not shown by FIG. 13.

The sensor circuitry 1321 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1318 connects the system 1300 to actuators 1324, allow system 1300 to change its state, position, and/or orientation, or move or control a mechanism or system. The actuators 1322 comprise electrical and/or mechanical devices for moving or controlling a mechanism or system, and converts energy (e.g., electric current or moving air and/or liquid) into some kind of motion. The actuators 1322 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1322 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 1300 may be configured to operate one or more actuators 1322 based on one or more captured events and/or instructions or control signals received from a service provider and/or various client systems. In embodiments, the system 1300 may transmit instructions to various actuators 1322 (or controllers that control one or more actuators 1322) to reconfigure an electrical network as discussed herein.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the communication circuitry 1309 to communicate with the nodes and components of the positioning network. The positioning circuitry 1345 may also provide position data and/or time data to the application circuitry, which may use the data to synchronize operations with various infrastructure (e.g., radio base stations), for turn-by-turn navigation, or the like.

The input/output (I/O) devices 1386 may be present within, or connected to, the system 1300. The I/O devices 1386 include input device circuitry and output device circuitry including one or more user interfaces designed to enable user interaction with the system 1300 and/or peripheral component interfaces designed to enable peripheral component interaction with the system 1300. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the system 1300. The output device circuitry may also include speakers or other audio emitting devices, printer(s), and/or the like. In some embodiments, the sensor circuitry 1321 may be used as the input device circuitry (e.g., an image capture device, motion capture device, or the like) and one or more actuators 1322 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1324 may be coupled to the system 1300 to power the system 1300, which may be used in embodiments where the system 1300 is not in a fixed location, such as when the system 1300 is a mobile or laptop client system 105. The battery 1324 may be a lithium ion battery, a lead-acid automotive battery, or a metal-air battery, such as a zinc-air battery, an aluminum-air battery, a lithium-air battery, a lithium polymer battery, and/or the like. In embodiments where the system 1300 is mounted in a fixed location, such as when the system is implemented as a server computer system, the system 1300 may have a power supply coupled to an electrical grid. In these embodiments, the system 1300 may include power tee circuitry to provide for electrical power drawn from a network cable to provide both power supply and data connectivity to the system 1300 using a single cable.

Power management integrated circuitry (PMIC) 1326 may be included in the system 1300 to track the state of charge (SoCh) of the battery 1324, and to control charging of the system 1300. The PMIC 1326 may be used to monitor other parameters of the battery 1324 to provide failure predictions, such as the state of health (SoH) and the state of function (SoF) of the battery 1324. The PMIC 1326 may include voltage regulators, surge protectors, power alarm detection circuitry. The power alarm detection circuitry may detect one or more of brown out (under-voltage) and surge (over-voltage) conditions. The PMIC 1326 may communicate the information on the battery 1324 to the processor circuitry 1302 over the IX 1306. The PMIC 1326 may also include an analog-to-digital (ADC) convertor that allows the processor circuitry 1302 to directly monitor the voltage of the battery 1324 or the current flow from the battery 1324. The battery parameters may be used to determine actions that the system 1300 may perform, such as transmission frequency, mesh network operation, sensing frequency, and the like.

A power block 1328, or other power supply coupled to an electrical grid, may be coupled with the PMIC 1326 to charge the battery 1324. In some examples, the power block 1328 may be replaced with a wireless power receiver to obtain the power wirelessly, for example, through a loop antenna in the system 1300. In these implementations, a wireless battery charging circuit may be included in the PMIC 1326. The specific charging circuits chosen depend on the size of the battery 1324 and the current required.

The system 1300 may include any combinations of the components shown by FIG. 13, however, some of the components shown may be omitted, additional components may be present, and different arrangement of the components shown may occur in other implementations. In one example where the system 1300 is or is part of a server computer system, the battery 1324, communication circuitry 1309, the sensors 1321, actuators 1322, and/or POS 1345, and possibly some or all of the I/O devices 1386 may be omitted.

Some non-limiting examples are provided infra.

Example 1 includes one or more computer-readable storage media (CRSM) comprising instructions, wherein execution of the instructions by a processing device is to cause the processing device to: generate and render a graphical user interface (GUI) in a browser or application container, the GUI comprising one or more graphical objects; identify one or more resources corresponding to individual graphical objects of the one or more graphical objects; send a message to a reputation system, the message indicating the identified resources; obtain, from the reputation system, a deceptor indicator indicating at least one deceptive resource of the identified resources; obfuscate a graphical object of the one or more graphical objects corresponding to the deceptive resource.

Example 2 includes the one or more CRSM of example 1 and/or some other example(s) herein, wherein execution of the instructions is to cause the processing device to: obtain a web document including instructions for generation and rendering of the GUI in the browser or the application container; and identify the one or more resources in the obtained web document.

Example 3 includes the one or more CRSM of examples 1-2 and/or some other example(s) herein, wherein execution of the instructions is to cause the processing device to: unobfuscate the obfuscated graphical object in response to detection of a user interaction with the obfuscated graphical object.

Example 4 includes the one or more CRSM of example 3 and/or some other example(s) herein, wherein the user interaction is a hover over the graphical resource with a pointer or a desired gesture performed on the graphical resource.

Example 5 includes the one or more CRSM of examples 1-4 and/or some other example(s) herein, wherein the deceptor indicator includes an obfuscation intensity value, and execution of the instructions is to cause the processing device to: adjust the obfuscation of the graphical object based on the obfuscation intensity value.

Example 6 includes the one or more CRSM of example 5 and/or some other example(s) herein, wherein the obfuscation intensity value is a weight factor, and, to adjust the obfuscation, execution of the instructions is to cause the processing device to: adjust an extent to which the obfuscation increases or decreases between a center of the graphical object of the deceptive resource and edges of the graphical object of the deceptive resource.

Example 7 includes the one or more CRSM of examples 5-6 and/or some other example(s) herein, wherein the obfuscation intensity value is a scaling factor, and, to adjust the obfuscation, execution of the instructions is to cause the processing device to: apply the scaling factor to a default amount of obfuscation.

Example 8 includes the one or more CRSM of examples 1-7 and/or some other example(s) herein, wherein, to obfuscate the graphical object, execution of the instructions is to cause the processing device to: inject obfuscation code into a portion of source code of the GUI associated with the graphical object of the deceptive resource, the obfuscation code to instruct the web browser or application container to obfuscate the graphical object of the deceptive resource.

Example 9 includes the one or more CRSM of examples 1-8 and/or some other example(s) herein, wherein execution of the instructions is to cause the processing device to: obtain, from the reputation system, a trustworthiness indicator indicating at least one trusted resource of the identified resources; illuminate a graphical object of the one or more graphical objects corresponding to the at least one trusted resource; and unilluminate the illuminated graphical object in response to detection of a user interaction with the illuminated graphical object.

Example 10 includes the one or more CRSM of examples 1-9 and/or some other example(s) herein, wherein execution of the instructions is to cause the processing device to: store, in a local caching system, the deceptor indicator in association with the at least one deceptive resource.

Example 11 includes a computing system comprising processor circuitry coupled with network interface circuitry (NIC), wherein the NIC is configured to: obtain, from a remote service provider system, source code including instructions for generating and rendering a graphical user interface (GUI) in a browser or an application container, transmit a first message to a reputation system to indicate one or more identified resources, and receive a second message from the reputation system, the second message including a trustworthiness indicator; and the processor circuitry is configured to operate the browser or the application container to: generate and render the GUI in the browser or the application container, the GUI comprising one or more graphical objects; identify one or more resources in the source code; generate the first message to indicate the identified resources; determine, based on the trustworthiness indicator, at least one trustworthy resource (TR) of the identified resources; illuminate a graphical object of the one or more graphical objects corresponding to the TR.

Example 12 includes the computing system of example 11 and/or some other example(s) herein, wherein the processor circuitry is configured to operate the browser or the application container to: detect a desired user interaction with the illuminated graphical object; and remove the illumination from illuminated graphical object in response to detection of the desired user interaction with the illuminated graphical object.

Example 13 includes the computing system of example 12 and/or some other example(s) herein, wherein the desired user interaction is a hover over the graphical resource with a pointer or a predefined gesture performed on the graphical resource.

Example 14 includes the computing system of example 11 and/or some other example(s) herein, wherein the trustworthiness indicator includes a illumination intensity value, and the processor circuitry is configured to operate the browser or the application container to: adjust the illumination applied to the graphical object based on the illumination intensity value.

Example 15 includes the computing system of example 14 and/or some other example(s) herein, wherein, to adjust the illumination, the processor circuitry is configured to operate the browser or the application container to: apply the illumination intensity value to an illumination function, wherein the illumination function is to increase or decrease an illumination of the graphical object of the TR according to the illumination intensity value.

Example 16 includes the computing system of example 14 and/or some other example(s) herein, wherein the illumination intensity value is a scaling factor, and, to adjust the illumination, the processor circuitry is configured to operate the browser or the application container to: apply the scaling factor to a default illumination value; and apply the scaled illumination value to an illumination function, wherein the illumination function is to increase or decrease an illumination of the graphical object of the TR according to the illumination intensity value.

Example 17 includes the computing system of example 11 and/or some other example(s) herein, wherein, to obfuscate the graphical object, the processor circuitry is configured to operate the browser or the application container to: inject illumination code into a portion of source code of the GUI associated with the graphical object of the TR, the illumination code to instruct the web browser or the application container to illuminate the graphical object associated with the TR.

Example 18 includes the computing system of example 11 and/or some other example(s) herein, wherein the processor circuitry is configured to operate the browser or the application container to: obtain, from the reputation system, an obfuscation indicator indicating at least one deceptive resource of the identified resources; obfuscate a graphical object of the one or more graphical objects corresponding to the at least one deceptive resource; and unobfuscate the obfuscated graphical object in response to detection of a desired user interaction with the obfuscate graphical object.

Example 19 includes an apparatus comprising: means for receiving from a remote service provider system, source code including instructions for generating and rendering a graphical user interface (GUI) in a browser or an application container; means for generating and rendering the GUI in the browser or the application container, the GUI comprising one or more graphical objects; means for identifying one or more resources corresponding to individual graphical objects of the one or more graphical objects; means for sending, to a remote reputation system, a message indicating the identified resources; means for obtaining, from the remote reputation system, one or more indicators, each indicator of the one or more indicators indicating a resource of the identified resources to be obfuscated or illuminated; means for obfuscating a graphical object corresponding to a resource indicated by an indicator of the one or more indicators when that indicator indicates to obfuscate the resource; means for illuminating a graphical object corresponding to a resource indicated by an indicator of the one or more indicators when that indicator indicates to illuminate the resource; and means for removing, in response to detecting a user interaction with the obfuscated or illuminated graphical object, the obfuscation or the illumination from the obfuscated or illuminated graphical object in response to detecting the user interaction with the obfuscated or illuminated graphical object.

Example 20 includes the apparatus of example 19 and/or some other example(s) herein, wherein the user interaction is a hover over the graphical resource with a pointer or a desired gesture performed on the graphical resource.

Example 21 includes the apparatus of examples 19-20 and/or some other example(s) herein, wherein the source code is included in a web document including instructions for generation and rendering of the GUI in the browser or the application container, and the means for identifying is for identifying the one or more resources in the obtained web document.

Example 22 includes the apparatus of examples 19-21 and/or some other example(s) herein, wherein the indicator includes an obfuscation intensity value and/or an illumination intensity value, wherein the means for obfuscating is for adjusting the obfuscation of the graphical object to be obfuscated based on the obfuscation intensity value, and the means for illuminating is for adjusting the illumination of the graphical object to be illuminated based on the illumination intensity value.

Example 23 includes the apparatus of example 22 and/or some other example(s) herein, wherein the obfuscation intensity value and/or the illumination intensity value is a weight factor, wherein the means for obfuscating is for adjusting an extent to which the obfuscation increases or decreases between a center of the graphical object to be obfuscated and edges of the graphical object to be obfuscated based on the weight factor; and the means for illuminating is for increasing or decreasing an amount of illumination applied to the graphical object to be illuminated based on the weight factor.

Example 24 includes the apparatus of example 22 and/or some other example(s) herein, wherein the obfuscation intensity value and/or the illumination intensity value is a scaling factor, wherein the means for obfuscating is for applying the scaling factor to a default amount of obfuscation; and the means for illuminating is for applying the scaling factor to a default amount of illumination.

Example 25 includes the apparatus of examples 19-24 and/or some other example(s) herein, wherein: the means for obfuscating include means injecting obfuscation code into a portion of source code of the GUI associated with the graphical object to be obfuscated, the obfuscation code instructing the web browser or application container to obfuscate the graphical object to be obfuscated; and the means for illuminating include means injecting illumination code into a portion of source code of the GUI associated with the graphical object to be illuminated, the obfuscation code instructing the web browser or application container to illuminate the graphical object to be illuminated.

Example 26 includes a method comprising: generating and rendering, by a processing device, a graphical user interface (GUI) in a browser or application container, the GUI comprising one or more graphical objects; identifying, by the processing device, one or more resources corresponding to individual graphical objects of the one or more graphical objects; sending, by the processing device, a message to a reputation system, the message indicating the identified resources; obtaining, by the processing device from the reputation system, a deceptor indicator indicating at least one deceptive resource of the identified resources; and obfuscating, by the processing device, a graphical object of the one or more graphical objects corresponding to the deceptive resource.

Example 27 includes the method of example 26 and/or some other example(s) herein, wherein the method comprises: obtaining, by the processing device, a web document including instructions for generation and rendering of the GUI in the browser or the application container; and identifying, by the processing device, the one or more resources in the obtained web document.

Example 28 includes the method of example 26 and/or some other example(s) herein, wherein the method comprises: unobfuscating, by the processing device, the obfuscated graphical object in response to detection of a user interaction with the obfuscated graphical object.

Example 29 includes the method of example 28 and/or some other example(s) herein, wherein the user interaction is a hover over the graphical resource with a pointer or a desired gesture performed on the graphical resource.

Example 30 includes the method of example 26 and/or some other example(s) herein, wherein the deceptor indicator includes an obfuscation intensity value, and the method comprises: adjusting, by the processing device, the obfuscation of the graphical object based on the obfuscation intensity value.

Example 31 includes the method of example 30 and/or some other example(s) herein, wherein the obfuscation intensity value is a weight factor, and the adjusting comprises: adjusting, by the processing device, an extent to which the obfuscation increases or decreases between a center of the graphical object of the deceptive resource and edges of the graphical object of the deceptive resource.

Example 32 includes the method of example 30 and/or some other example(s) herein, wherein the obfuscation intensity value is a scaling factor, and the adjusting comprises: applying, by the processing device, the scaling factor to a default amount of obfuscation.

Example 33 includes the method of example 26 and/or some other example(s) herein, wherein obfuscating the graphical object comprises: injecting, by the processing device, obfuscation code into a portion of source code of the GUI associated with the graphical object of the deceptive resource, the obfuscation code instructing the web browser or application container to obfuscate the graphical object of the deceptive resource.

Example 34 includes the method of example 26 and/or some other example(s) herein, wherein the method comprises: obtaining, by the processing device from the reputation system, a trustworthiness indicator indicating at least one trusted resource of the identified resources; illuminating, by the processing device, a graphical object of the one or more graphical objects corresponding to the at least one trusted resource; and unilluminating, by the processing device, the illuminated graphical object in response to detection of a user interaction with the illuminated graphical object.

Example 35 includes the method of example 26 and/or some other example(s) herein, wherein the method comprises: storing, by the processing device in a local caching system, the deceptor indicator in association with the at least one deceptive resource.

Example 36 includes a method comprising: obtaining, by a computing system from a remote service provider system, source code including instructions for generating and rendering a graphical user interface (GUI) in a browser or an application container; generating and rendering, by the computing system, the GUI in a browser or application container, the GUI comprising one or more graphical objects; identifying, by the computing system, one or more resources in the source code; generating, by the computing system, a first message to indicate the identified resources; transmitting, by the computing system, the first message to a reputation system; receiving, by the computing system, a second message from the reputation system, the second message including a trustworthiness indicator; determining, by the computing system, at least one trustworthy resource (TR) of the identified resources based on the trustworthiness indicator; and illuminating, by the computing system, a graphical object of the one or more graphical objects corresponding to the TR.

Example 37 includes the method of example 36 and/or some other example(s) herein, wherein the method comprises: detecting, by the computing system, a desired user interaction with the illuminated graphical object; and removing, by the computing system, the illumination from illuminated graphical object in response to detection of the desired user interaction with the illuminated graphical object.

Example 38 includes the method of example 37 and/or some other example(s) herein, wherein the desired user interaction is a hover over the graphical resource with a pointer or a predefined gesture performed on the graphical resource.

Example 39 includes the method of example 36 and/or some other example(s) herein, wherein the trustworthiness indicator includes a illumination intensity value, and the method comprises: adjusting, by the computing system, the illumination applied to the graphical object based on the illumination intensity value.

Example 40 includes the method of example 39 and/or some other example(s) herein, wherein adjusting the illumination comprises: applying, by the computing system, the illumination intensity value to an illumination function, wherein the illumination function is to increase or decrease an illumination of the graphical object of the TR according to the illumination intensity value.

Example 41 includes the method of example 39 and/or some other example(s) herein, wherein the illumination intensity value is a scaling factor, and adjusting the illumination comprises: applying, by the computing system, the scaling factor to a default illumination value; and applying, by the computing system, the scaled illumination value to an illumination function, wherein the illumination function is to increase or decrease an illumination of the graphical object of the TR according to the illumination intensity value.

Example 42 includes the method of example 36 and/or some other example(s) herein, wherein obfuscating the graphical object comprises: injecting, by the computing system, illumination code into a portion of source code of the GUI associated with the graphical object of the TR, the illumination code to instruct the web browser or the application container to illuminate the graphical object associated with the TR.

Example 43 includes the method of example 36 and/or some other example(s) herein, wherein the method comprises: obtaining, by the computing system from the reputation system, an obfuscation indicator indicating at least one deceptive resource of the identified resources; obfuscating, by the computing system, a graphical object of the one or more graphical objects corresponding to the at least one deceptive resource; and unobfuscating, by the computing system, the obfuscated graphical object in response to detection of a desired user interaction with the obfuscate graphical object.

Example 44 includes a computer-implemented method comprising: receiving, by a client system, from a remote service provider system, source code including instructions for generating and rendering a graphical user interface (GUI) in a browser or an application container; generating and rendering, by the client system, the GUI in the browser or the application container, the GUI comprising one or more graphical objects; identifying, by the client system, one or more resources corresponding to individual graphical objects of the one or more graphical objects; sending, by the client system to a remote reputation system, a message indicating the identified resources; obtaining, by the client system from the remote reputation system, one or more indicators, each indicator of the one or more indicators indicating a resource of the identified resources to be obfuscated or illuminated; for each indicator of the one or more indicators, obfuscating, by the client system, a graphical object corresponding to a resource indicated by the indicator when the indicator indicates to obfuscate the resource, and illuminating, by the client system, a graphical object corresponding to a resource indicated by the indicator when the indicator indicates to illuminate the resource; and removing, by the client system in response to detecting a user interaction with the obfuscated or illuminated graphical object, the obfuscation or the illumination from the obfuscated or illuminated graphical object in response to detecting the user interaction with the obfuscated or illuminated graphical object.

Example 45 includes the method of example 44 and/or some other example(s) herein, wherein the user interaction is a hover over the graphical resource with a pointer or a desired gesture performed on the graphical resource.

Example 46 includes the method of examples 44-45 and/or some other example(s) herein, further comprising: obtaining, by the client, a web document including instructions for generation and rendering of the GUI in the browser or the application container; and identifying, by the client, the one or more resources in the obtained web document.

Example 47 includes the method of examples 44-46 and/or some other example(s) herein, wherein the indicator includes an obfuscation intensity value and/or an illumination intensity value, the obfuscating comprises adjusting the obfuscation of the graphical object to be obfuscated based on the obfuscation intensity value, and the illuminating comprises adjusting the illumination of the graphical object to be illuminated based on the illumination intensity value.

Example 48 includes the method of example 47 and/or some other example(s) herein, wherein the obfuscation intensity value and/or the illumination intensity value is a weight factor, wherein the obfuscating comprises adjusting an extent to which the obfuscation increases or decreases between a center of the graphical object to be obfuscated and edges of the graphical object to be obfuscated based on the weight factor; and the illuminating comprises increasing or decreasing an amount of illumination applied to the graphical object to be illuminated based on the weight factor.

Example 49 includes the method of example 47 and/or some other example(s) herein, wherein the obfuscation intensity value and/or the illumination intensity value is a scaling factor, wherein the obfuscating comprises applying the scaling factor to a default amount of obfuscation; and the illuminating comprises applying the scaling factor to a default amount of illumination.

Example 50 includes the method of examples 44-49 and/or some other example(s) herein, wherein the obfuscating comprises injecting obfuscation code into a portion of source code of the GUI associated with the graphical object to be obfuscated, the obfuscation code instructing the web browser or application container to obfuscate the graphical object to be obfuscated; and the illuminating comprises injecting illumination code into a portion of source code of the GUI associated with the graphical object to be illuminated, the obfuscation code instructing the web browser or application container to illuminate the graphical object to be illuminated.

Example 51 includes one or more computer-readable storage media (CRSM) comprising instructions, wherein execution of the instructions by a processing device is to cause the processing device to perform the method of any one or more of examples 26-50.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group) that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. As used herein, the term "module" may refer to one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like. As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, webpages, web applications, and/or the like. The term "network resource" may refer to a resource hosted by a remote entity and accessible over a network. The term "document" may refer to a computer file or resource used to record data, and includes various file types or formats such as word processing, spreadsheet, slide presentation, multimedia items, and the like.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. Additionally, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network. The term "computer system" may include any type of electronic devices, such as a cellular phone or smart phone, tablet personal computer, wearable computing device, an autonomous sensor, laptop computer, desktop personal computer, a video game console, a digital media player, a handheld messaging device, a personal data assistant, an electronic book reader, an augmented reality device, server computer device(s) (e.g., stand-alone, rack-mounted, blade, etc.), and/or any other like electronic device.

The term "server" as used herein refers to a computing device or system, including processing hardware and/or process space(s), an associated storage medium such as a memory device or database, and, in some instances, suitable application(s) as is known in the art. The terms "server system" and "server" may be used interchangeably herein. that provides access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. One or more non-transitory computer-readable storage media (NTCRSM) comprising instructions, wherein execution of the instructions by a processing device is operable to cause the processing device to:

generate and render a graphical user interface (GUI) of a search results webpage in a client application (app), the search results webpage including a set of search result elements (SREs), wherein each SRE of the set of SREs is defined by a set of tags and each SRE includes content related to a corresponding search result and a reference to a resource of the corresponding search result;

identify one or more resources within each SRE;

determine one or more deceptive resources from among the identified one or more resources based on a comparison of the identified one or more resources with a stored set of deceptor indicators, the stored set of deceptor indicators indicating resources exhibiting deceptive or malicious behaviors;

identify deceptor SREs among the set of SREs, the deceptor SREs being SREs that include at least one deceptive resource among the defined set of tags of the SREs;

obfuscate an entirety of each deceptor SRE without disabling references within each deceptor SRE; and in response to detection of a pointer hovering over an obfuscated deceptor SRE, unobfuscate the hovered-over deceptor SRE.

2. The one or more NTCRSM of claim 1, wherein execution of the instructions is operable to cause the processing device to:

obtain a web document including source code of the search results webpage, the source code for generation and rendering of the GUI in the client app; and identify the set of SREs and each resource within the obtained web document based on the set of tags making up each SRE.

3. The one or more NTCRSM of claim 1, wherein execution of the instructions is operable to cause the processing device to:

obtain the set of deceptor indicators from a reputation system; and store the set of deceptor indicators in a local caching system.

4. The one or more NTCRSM of claim 1, wherein each deceptor indicator of the set of deceptor indicators includes an obfuscation intensity value, and execution of the instructions is operable to cause the processing device to:

adjust the obfuscation of a corresponding deceptor SRE based on the obfuscation intensity value.

5. The one or more NTCRSM of claim 4, wherein to adjust the obfuscation, execution of the instructions is operable to cause the processing device to:

when the obfuscation intensity value is a weight factor, adjust an extent to which the obfuscation increases or decreases between a center of the corresponding deceptor SRE and edges of the corresponding deceptor SRE; and when the obfuscation intensity value is a scaling factor, apply the scaling factor to a default amount of obfuscation.

6. The one or more NTCRSM of claim 1, wherein to obfuscate the entirety of each deceptor SRE, execution of the instructions is operable to cause the processing device to:

inject obfuscation code into portions of the source code associated with respective deceptor SREs, the obfuscation code to instruct the client app to obfuscate the deceptor SREs.

7. The one or more NTCRSM of claim 1, wherein, to obfuscate the entirety of each deceptor SRE, execution of the instructions is operable to cause the processing device to:

apply a stylesheet to source code of the search results webpage such that an obfuscation function is applied to the set of tags of each deceptor SRE;

inject respective style tags around the set of tags of each deceptor SRE, wherein the respective style tags include the obfuscation function; or inject respective style attributes to the set of tags of each deceptor SRE, wherein a value of the respective style attributes includes the obfuscation function.

8. The one or more NTCRSM of claim 1, wherein execution of the instructions is operable to cause the processing device to:

determine at least one trusted resource (TR) of the identified resources based on a set of stored trustworthiness indicators indicating corresponding TRs;

illuminate each SRE of the set of SREs corresponding to the at least one TR; and unilluminate the illuminated SRE in response to detection of a user interaction with the illuminated SRE.

9. The one or more NTCRSM of claim 1, wherein, to obfuscate the entirety of each deceptor SRE, execution of the instructions is operable to cause the processing device to:

apply a blurring effect as the obfuscation to each deceptor SRE.

10. A computing system, comprising:

communication circuitry configurable to obtain an electronic document including source code of a search results webpage, the source code of the search results webpage including a set of search result elements (SREs), wherein each SRE of the set of SREs is defined by a set of tags and each SRE includes content related to a corresponding search result and a reference to a resource of the corresponding search result;

memory circuitry configured to store program code of a client application (app) and a verification component; and processor circuitry communicatively coupled with the communication circuitry and the memory circuitry, the processor circuitry configurable to:

operate the client app to generate and render a graphical user interface (GUI) of the search results webpage based on the source code; and operate the verification component to:

identify one or more resources within each SRE;

determine one or more deceptive resources among the identified one or more resources based on a comparison of the identified one or more resources with a stored set of deceptor indicators, the stored set of deceptor indicators indicating resources exhibiting deceptive or malicious behaviors;

identify deceptor SREs among the set of SREs to be SREs that include at least one deceptive resource among the defined set of tags of the SREs;

obfuscate an entirety of each deceptor SRE without disabling references within each deceptor SRE; and response to detection of a pointer hovering over an obfuscated deceptor SRE, unobfuscate an obfuscated deceptor SRE.

11. The computing system of claim 10, wherein the verification component is operable to identify the one or more resources in the obtained electronic document.

12. The computing system of claim 10, wherein:

the communication circuitry is configurable to obtain the set of deceptor indicators from a reputation system;

the memory circuitry is configured to store the set of deceptor indicators; and the processor circuitry is configurable to determine the one or more deceptive resources based on the stored set of deceptor indicators.

13. The computing system of claim 12, wherein the set of deceptor indicators are database objects including information for obfuscating the deceptor SREs within the GUI of the search results webpage.

14. The computing system of claim 12, wherein each deceptor indicator of the set of deceptor indicators includes an obfuscation intensity value, and the processor circuitry is configurable to:
  adjust the obfuscation of each deceptor SRE based on respective obfuscation intensity values.

15. The computing system of claim 14, wherein, to adjust the obfuscation, the processor circuitry is configurable to:
  when the obfuscation intensity value is a weight factor, adjust an extent to which the obfuscation increases or decreases between a center of each deceptor SRE and edges of each deceptor SRE; and
  when the obfuscation intensity value is a scaling factor, apply the scaling factor to a default amount of obfuscation.

16. The computing system of claim 10, wherein, to obfuscate the entirety of each deceptor SRE, the processor circuitry is configurable to:
  inject obfuscation code into portions of the source code associated with respective deceptor SREs, the obfuscation code to instruct the client app to obfuscate the deceptor SREs.

17. The computing system of claim 10, wherein, to obfuscate the entirety of each deceptor SRE, the processor circuitry is configurable to operate the verification component:
  apply a stylesheet to source code of the search results webpage such that an obfuscation function is applied to the set of tags of each deceptor SRE;
  inject respective style tags around the set of tags of each deceptor SRE, wherein the respective style tags include the obfuscation function; or
  inject respective style attributes to the set of tags of each deceptor SRE, wherein a value of the respective style attributes includes the obfuscation function.

18. The computing system of claim 10, wherein the processor circuitry is configurable to: apply a blurring effect as the obfuscation to each deceptor SRE.

19. The computing system of claim 10, wherein the client app is a web browser and the verification component is a plugin or browser extension of the web browser, or the client app is a desktop application and the verification component is a separate application capable of communicating with the desktop application.

* * * * *